US008626749B1

(12) United States Patent
Trepetin et al.

(10) Patent No.: US 8,626,749 B1
(45) Date of Patent: Jan. 7, 2014

(54) SYSTEM AND METHOD OF ANALYZING ENCRYPTED DATA IN A DATABASE IN NEAR REAL-TIME

(76) Inventors: Stan Trepetin, New York, NY (US); Mark Reston, Hillsborough, NJ (US)

( * ) Notice: Subject to any disclaimer, the term of this patent is extended or adjusted under 35 U.S.C. 154(b) by 41 days.

(21) Appl. No.: 13/090,803

(22) Filed: Apr. 20, 2011

Related U.S. Application Data

(60) Provisional application No. 61/326,405, filed on Apr. 21, 2010.

(51) Int. Cl.
*G06F 17/30* (2006.01)

(52) U.S. Cl.
USPC .......................................................... 707/722

(58) Field of Classification Search
None
See application file for complete search history.

(56) References Cited

U.S. PATENT DOCUMENTS

| | | | | |
|---|---|---|---|---|
| 5,963,642 | A * | 10/1999 | Goldstein | 713/193 |
| 6,275,824 | B1 * | 8/2001 | O'Flaherty et al. | 1/1 |
| 6,792,425 | B2 * | 9/2004 | Yagawa et al. | 1/1 |
| 7,302,420 | B2 * | 11/2007 | Aggarwal et al. | 707/688 |
| 7,500,111 | B2 | 3/2009 | Hacigumus | |
| 7,606,788 | B2 * | 10/2009 | Samar | 1/1 |
| 7,668,820 | B2 * | 2/2010 | Zuleba | 707/765 |
| 7,672,967 | B2 * | 3/2010 | Fay | 707/999.102 |
| 7,685,437 | B2 * | 3/2010 | Hacigumus et al. | 713/193 |
| 7,933,909 | B2 * | 4/2011 | Trepetin | 707/755 |
| 7,958,162 | B2 * | 6/2011 | Basile | 707/804 |
| 8,112,422 | B2 * | 2/2012 | Srivastava et al. | 707/737 |
| 2002/0169793 | A1 * | 11/2002 | Sweeney | 707/204 |
| 2003/0046572 | A1 * | 3/2003 | Newman et al. | 713/193 |
| 2003/0220927 | A1 * | 11/2003 | Iverson et al. | 707/100 |
| 2004/0243799 | A1 * | 12/2004 | Hacigumus et al. | 713/150 |
| 2005/0049991 | A1 * | 3/2005 | Aggarwal et al. | 707/1 |
| 2005/0147240 | A1 * | 7/2005 | Agrawal et al. | 380/28 |
| 2005/0147246 | A1 * | 7/2005 | Agrawal et al. | 380/44 |
| 2005/0268094 | A1 * | 12/2005 | Kohan et al. | 713/165 |
| 2005/0283621 | A1 * | 12/2005 | Sato et al. | 713/189 |
| 2006/0020611 | A1 * | 1/2006 | Gilbert et al. | 707/100 |
| 2007/0130106 | A1 * | 6/2007 | Gadiraju | 707/2 |
| 2007/0140479 | A1 * | 6/2007 | Wang et al. | 380/30 |
| 2007/0233711 | A1 * | 10/2007 | Aggarwal et al. | 707/100 |
| 2007/0255704 | A1 * | 11/2007 | Baek et al. | 707/6 |
| 2008/0082566 | A1 * | 4/2008 | Aggarwal et al. | 707/102 |
| 2008/0109459 | A1 * | 5/2008 | Trepetin | 707/100 |
| 2008/0114991 | A1 * | 5/2008 | Jonas | 713/193 |
| 2008/0133935 | A1 * | 6/2008 | Elovici et al. | 713/193 |
| 2009/0018820 | A1 * | 1/2009 | Sato et al. | 704/9 |

(Continued)

OTHER PUBLICATIONS

Sweeney, Latanya. Computational Disclosure Control: A Primer on Data Privacy Protection. Cambridge, MA: Massachusetts Institute of Technology, 2001.

(Continued)

*Primary Examiner* — Ajay Bhatia
*Assistant Examiner* — Grace Park
(74) *Attorney, Agent, or Firm* — Henry J. Cittone; Cittone & Chinta LLP

(57) ABSTRACT

The present invention relates generally to a system and method of querying an anonymized database. More particularly, the invention provides a method and system for querying an anonymized database without the need to decrypt queried data while it's processed. Even more specifically, the invention provides a method and system of anonymizing a database such that it may be queried efficiently in near real time while still retaining the ability to not decrypt requested data while it's being processed.

27 Claims, 15 Drawing Sheets

(56) References Cited

U.S. PATENT DOCUMENTS

| | | | | |
|---|---|---|---|---|
| 2009/0077378 | A1* | 3/2009 | Hacigumus et al. | 713/165 |
| 2009/0132419 | A1* | 5/2009 | Grammer et al. | 705/50 |
| 2009/0303237 | A1* | 12/2009 | Liu et al. | 345/440 |
| 2009/0327296 | A1* | 12/2009 | Francis et al. | 707/9 |
| 2009/0327748 | A1* | 12/2009 | Agrawal et al. | 713/189 |
| 2010/0042583 | A1* | 2/2010 | Gervais et al. | 707/3 |
| 2010/0058476 | A1* | 3/2010 | Isoda | 726/26 |
| 2010/0077006 | A1* | 3/2010 | El Emam et al. | 707/785 |
| 2010/0114840 | A1* | 5/2010 | Srivastava et al. | 707/688 |
| 2010/0114920 | A1* | 5/2010 | Srivastava et al. | 707/757 |
| 2010/0192220 | A1* | 7/2010 | Heizmann et al. | 726/19 |
| 2010/0241641 | A1* | 9/2010 | Byun et al. | 707/757 |
| 2010/0281069 | A1* | 11/2010 | Stephenson et al. | 707/803 |
| 2011/0179011 | A1* | 7/2011 | Cardno et al. | 707/709 |
| 2011/0277037 | A1* | 11/2011 | Burke et al. | 726/26 |

OTHER PUBLICATIONS

Wikipedia. "Deterministic Encryption." Jul. 20, 2005.

Wikipedia. "Probabilistic Encryption." Sep. 3, 2005.

Agrawal, Rakesh, Alexandre Evfimievski, and Ramakrishnan Srikant. "Information Sharing Across Private Databases" (Association for Computing Machinery, Special Interest Group on Management of Data, Jun. 9-12, 2003).

Blakley, G.R., and Catherine Meadows. "A Database Encryption Scheme which Allows the Computation of Statistics using Encrypted Data" (IEEE Symposium on Security and Privacy, Apr. 22-24, 1985).

Menezes, Alfred, Paul C. van Oorschot and Scott A. Vanstone. "Chapter 1." Handbook of Applied Cryptography. Aug. 2001. 1-48.

Menezes, Alfred, Paul C. van Oorschot, and Scott A. Vanstone. "Chapter 7." Handbook of Applied Cryptography. Aug. 2001. 223-282.

Menezes, Alfred, Paul C. van Oorschot, and Scott A. Vanstone. "Chapter 8." Handbook of Applied Cryptography. Aug. 2001. 283-319.

Menezes, Alfred, Paul C. van Oorschot, and Scott A. Vanstone. "Chapter 9." Handbook of Applied Cryptography. Aug. 2001. 321-83.

Fagin, Ronald, Moni Naor, and Peter Winkler. "Comparing Information without Leaking It." Communications of the ACM, vol. 39 Issue 5 (May 1996): 77-85.

Rivest, Ronald, L. Adleman, and M. L. Dertouzos. "On Data Banks and Privacy Homomorphisms." In Foundations of Secure Computation, edited by R.A. DeMillo, 169-177. New York: Academic Press, Dec. 1978.

Song, Dawn Xiaodong, David Wagner, and Adrian Perrig. "Practical Techniques for Searches on Encrypted Data" (IEEE Symposium on Security and Privacy, May 2000) 44-55.

Domingo-Ferrer, Josep. "A Provably Secure Additive and Multiplicative Privacy Homomorphism." In Lecture Notes in Computer Science 2433, edited by AH Chan, 471-483. London: Springer-Verlag, Sep. 2002.

Chaum, David, Claude Crepeau, and Ivan Damgard. "Multiparty Unconditionally Secure Protocols" (Proceedings of the 20th Symposium on the Theory of Computing, May 1988).

Chaum, David, Ivan Damgard, and Jeroen van de Graaf. "Multiparty Computations Ensuring Privacy of Each Party's Input and Correctness of the Result." Lecture Notes in Computer Science, 293 (Aug. 1987): 87-119.

Rivest, Ronald L. and Alan T. Sherman. "Randomized Encryption Techniques."Advances in Cryptology: Proceedings of Crypto 82. David Chaum, Ronald L. Rivest, and Alan T. Sherman, eds., Plenum Press (New York) (Aug. 1982), 145-163.

* cited by examiner

B1 TABLE:

| first_name | last_name | city |
|---|---|---|
| Bob | Jones | Chicago |
| Sally | Smith | Tampa |
| George | Jones | Memphis |
| Sally | Lurie | Dallas |
| Sally | Jackson | Miami |
| Harry | Felix | San Diego |
| Bob | Smith | New York |
| Roger | Lurie | Newark |
| Will | Jones | Boston |

RESULTING E1 TABLE

| Column | Token | Frequency | Rows needed |
|---|---|---|---|
| first_name | Sally | 3 | 0 |
| first_name | Bob | 2 | 1 |
| first_name | George | 1 | 2 |
| first_name | Harry | 1 | 2 |
| first_name | Roger | 1 | 2 |
| first_name | Will | 1 | 0 |
| last_name | Jones | 3 | 0 |
| last_name | Smith | 2 | 1 |
| last_name | Lurie | 2 | 1 |
| last_name | Jackson | 1 | 2 |
| last_name | Felix | 1 | 2 |
| city | Chicago | 1 | 0 |
| city | Tampa | 1 | 0 |
| city | Memphis | 1 | 0 |
| city | Dallas | 1 | 0 |
| city | Miami | 1 | 0 |
| city | San Diego | 1 | 0 |
| city | New York | 1 | 0 |
| city | Newark | 1 | 0 |
| city | Boston | 1 | 0 |

Aggregate rows needed for first_name = 7

Aggregate rows needed for last_name = 6

Aggregate rows needed for city = 0

FIG. 1

B1 TABLE first_name last_name city GpNum RecInfo

| Bob | Jones | Chicago | 1 | True |
|---|---|---|---|---|
| Sally | Smith | Tampa | 1 | True |
| George | Jones | Memphis | 1 | True |
| Sally | Lurie | Dallas | 2 | True |
| Sally | Jackson | Miami | 2 | True |
| Harry | Felix | San Diego | 3 | True |
| Bob | Smith | New York | 3 | True |
| Roger | Lurie | Newark | 3 | True |
| Will | Jones | Boston | 3 | True |

*Step 1: Copy random rows from B1 into C1 equaling in number to the maximum "rows needed" column value from E1, in this case 7.*

*Step 2: Create new groups in C1 (in this case groups 10 and 11 are created), and set the RecInfo values of the copied rows to False.*

RESULTING C1 TABLE first_name last_name city GpNum RecInfo

| Bob | Jones | Chicago | 10 | False |
|---|---|---|---|---|
| Sally | Smith | Tampa | 10 | False |
| Sally | Lurie | Dallas | 10 | False |
| Sally | Jackson | Miami | 11 | False |
| Bob | Smith | New York | 11 | False |
| Roger | Lurie | Newark | 11 | False |
| Will | Jones | Boston | 11 | False |

FIG. 2

B1 TABLE first_name    other columns

| Ron | ... |
|-----|-----|
| Jen | ... |
| Stu | ... |
| Jon | ... |
| Bob | ... |
| Jim | ... |
| Sal | ... |
| Roy | ... |
| Val | ... |

RESULTING F1 TABLE column    char. position    character    frequency    rows needed

| column | char. position | character | frequency | rows needed |
|--------|----------------|-----------|-----------|-------------|
| first_name | 1 | J | 3 | 0 |
| first_name | 1 | R | 2 | 1 |
| first_name | 1 | S | 2 | 1 |
| first_name | 1 | B | 1 | 2 |
| first_name | 1 | V | 1 | 2 |
| first_name | 2 | o | 4 | 0 |
| first_name | 2 | a | 2 | 2 |
| first_name | 2 | e | 1 | 3 |
| first_name | 2 | i | 1 | 3 |
| first_name | 2 | t | 1 | 3 |
| first_name | 2 | e | 1 | 3 |
| first_name | 3 | n | 3 | 0 |
| first_name | 3 | l | 2 | 1 |
| first_name | 3 | y | 1 | 2 |
| first_name | 3 | m | 1 | 2 |
| first_name | 3 | b | 1 | 2 |
| first_name | 3 | u | 1 | 0 |

Aggregate rows needed for position 1 = 6

Aggregate rows needed for position 2 = 14

Aggregate rows needed for position 3 = 7

FIG. 3

B1 TABLE

| first_name | other columns | GpNum | RecInfo |
|---|---|---|---|
| Ron | ... | 1 | True |
| Jen | ... | 1 | True |
| Stu | ... | 2 | True |
| Jon | ... | 2 | True |
| Bob | ... | 2 | True |
| Jim | ... | 2 | True |
| Sal | ... | 3 | True |
| Roy | ... | 3 | True |
| Val | ... | 3 | True |

*Step 1: Copy random rows from B1 into D1 equaling in number to the maximum "rows needed" column value, in this case 14.*

*Step 2: Create new groups in D1 (in this case, groups 10-14 are created), and set the RecInfo values for those rows to False.*

RESULTING D1 TABLE

| first_name | other columns | GpNum | RecInfo |
|---|---|---|---|
| Ron | ... | 10 | False |
| Jen | ... | 10 | False |
| Stu | ... | 10 | False |
| Jon | ... | 11 | False |
| Bob | ... | 11 | False |
| Jim | ... | 11 | False |
| Sal | ... | 12 | False |
| Roy | ... | 12 | False |
| Val | ... | 12 | False |
| Ron | ... | 13 | False |
| Jen | ... | 13 | False |
| Jon | ... | 13 | False |
| Bob | ... | 14 | False |
| Sal | ... | 14 | False |

FIG. 4

E1 TABLE

Column     Token     Frequency Rows needed

| Column | Token | Frequency | Rows needed |
|---|---|---|---|
| last_name | Jones | 3 | 0 |
| last_name | Smith | 2 | 1 |
| last_name | Lurie | 2 | 1 |
| last_name | Jackson | 1 | 2 |
| last_name | Felix | 1 | 2 |

C1 TABLE

| first_name | last_name | city | GpNum | RecInfo |
|---|---|---|---|---|
| Bob | Jones | Chicago | 10 | False |
| Sally | Smith | Tampa | 10 | False |
| Sally | Lurie | Dallas | 10 | False |
| Sally | Jackson | Miami | 11 | False |
| Bob | Smith | New York | 11 | False |
| Roger | Lurie | Newark | 11 | False |
| Will | Jones | Boston | 11 | False |

FIG. 5

TRANSFORMED C1 TABLE

| first_name | last_name | city | GpNum | RecInfo |
|---|---|---|---|---|
| Bob | Smith | Chicago | 10 | False |
| Sally | Lurie | Tampa | 10 | False |
| Sally | Jackson | Dallas | 10 | False |
| Sally | Jackson | Miami | 11 | False |
| Bob | Felix | New York | 11 | False |
| Roger | Felix | Newark | 11 | False |
| Will | Jones | Boston | 11 | False |

FIG. 6

F1 TABLE

| column | char. position | character | frequency | rows needed |
|---|---|---|---|---|
| first_name | 1 | J | 3 | 0 |
| first_name | 1 | R | 2 | 1 |
| first_name | 1 | S | 2 | 1 |
| first_name | 1 | B | 1 | 2 |
| first_name | 1 | V | 1 | 2 |

D1 TABLE

| first_name | other columns | GpNum | RecInfo |
|---|---|---|---|
| Ron | ... | 10 | False |
| Jen | ... | 10 | False |
| Stu | ... | 10 | False |
| Jon | ... | 11 | False |
| Bob | ... | 11 | False |
| Jim | ... | 11 | False |
| Sal | ... | 12 | False |
| Roy | ... | 12 | False |
| Val | ... | 12 | False |
| Ron | ... | 13 | False |
| Jen | ... | 13 | False |
| Jon | ... | 13 | False |
| Bob | ... | 14 | False |
| Sal | ... | 14 | False |

FIG. 7

TRANSFORMED D1 TABLE

| first_name | other columns | GpNum | RecInfo |
|---|---|---|---|
| Ron | ... | 10 | False |
| Sen | ... | 10 | False |
| Btu | ... | 10 | False |
| Bon | ... | 11 | False |
| Vob | ... | 11 | False |
| Vim | ... | 11 | False |
| Jal | ... | 12 | False |
| Roy | ... | 12 | False |
| Sal | ... | 12 | False |
| Bon | ... | 13 | False |
| Ven | ... | 13 | False |
| Jon | ... | 13 | False |
| Rob | ... | 14 | False |
| Sal | ... | 14 | False |

FIG. 8

RESULT SET RECEIVED FROM SERVER

| l_name | salary | age | GpNum | RecInfo | RowNum |
|---|---|---|---|---|---|
| r7dd | [(30000-25)*578892]+1232114 | [(17-45)*578892]+872123 | 23 | d | 7831 |
| w$kZ | [(18000-96)*866311]÷799001 | [(55-118)*1107932]+605532 | 72 | H | 10995 |

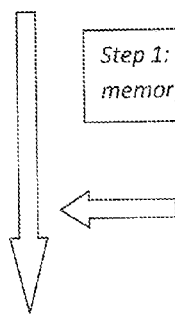

*Step 1: Discard all rows which belong to false groups using the Private Key file in memory showing which GpNums are false and which are true.*

| GpNum | Validity |
|---|---|
| 23 | False |
| 72 | True |
| <Other group numbers> | <Other True or False indicators> |

| l_name | salary | age | GpNum | RecInfo | RowNum |
|---|---|---|---|---|---|
| w$kZ | [(18000-96)*866311]÷799001 | [(55-118)*1107932]+605532 | 72 | H | 10995 |

*Step 2: Decode the length of all string columns using the Private Key file (the encoding file) showing how each string column length in each group, represented by a character in the ODB domain, is permuted into a different character in the ODB domain. Trim the string values as required by the lengths. (In this Figure, imagine the domain includes the alphabetized lower-case letters, alphabetized capital letters, and the digits 0-9, in that specific order within V1. The encoding "H" is a permutation of the character "c" as seen in the table immediately below. The character "c", in turn, means that the string has a length of 3 characters because "c" is the 3$^{rd}$ character in the list of all characters in the ordered V1. The encoded l_name must therefore be trimmed to a length of 3).*

| column | length representation | permuted length representation | GpNum |
|---|---|---|---|
| l_name | c | H | 72 |
| <Other columns> | <Other lengths representations> | <Other permuted length representations> | <Other group numbers> |

| l_name | salary | age | GpNum | RecInfo | RowNum |
|---|---|---|---|---|---|
| w$k | [(18000-96)*866311]÷799001 | [(55-118)*1107932]+605532 | 72 | H | 10995 |

FIG. 11A (REPRODUCED ROW)

| l_name | salary | age | GpNum | RecInfo | RowNum |
|---|---|---|---|---|---|
| w$k | [(18000-96)*866311]+799001 | [(55-118)*1107932]+605532 | 72 | H | 10995 |

*Step 3: Decode all the string columns by decoding one character position at a time using the Private Key file (the encoding file) in memory showing how each position in each column and group was originally permuted.*

| Original char. | Permuted char. | Column | Position | GpNum |
|---|---|---|---|---|
| L | w | last_name | 1 | 72 |
| e | $ | last_name | 2 | 72 |
| e | k | last_name | 3 | 72 |
| <Other characters> | <Other permutations> | <Other string columns> | <Other character positions> | <Other group numbers> |

| l_name | salary | age | GpNum | RecInfo | RowNum |
|---|---|---|---|---|---|
| Lee | [(18000-96)*866311]+799001 | [(55-118)*1107932]+605532 | 72 | H | 10995 |

*Step 4: Begin numeric decoding by re-instating the outliers. Check the RowNums returned in the result set. If any match the outlier RowNums in the Private Key file in memory, extract the original outlier value(s) and exchange it with the outlier value in the result set. (Note, in our implementation of the Private Key file, we placed all the outliers across different columns connected to a single RowNum in one row. It's also possible to have multiple rows for each RowNum rather than a single row in the Private Key file. Each such row would deal with a different column and its particular outlier value).*

| RowNum | column | original_value | <more cols.> | <more orig. vals.> |
|---|---|---|---|---|
| 10995 | salary | 89000 | <more columns for this row> | <more original values for this row> |
| <Other row numbers> | <Other columns> | <Other original outlier values> | <more columns for other rows> | <more original values for other rows> |

| l_name | salary | age | GpNum | RecInfo | RowNum |
|---|---|---|---|---|---|
| Lee | 89000 | [(55-118)*1107932]+605532 | 72 | H | 10995 |

FIG. 11B (REPRODUCED ROW)

| l name | salary | age | GpNum | RecInfo | RowNum |
|---|---|---|---|---|---|
| Lee | 89000 | [(55-118)*1107932]+605532 | 72 | H | 10995 |

Step 5: Finish numeric decoding. Compute the original values of all the numeric columns (the formula is: original value = ([encoded_value − random addend] / random multiplier) + average)) using the Private Key file in memory showing the average, random addend, and random multiplier for each numeric column for each group.

| column | average_val | random_multiplier | random_addend | GpNum |
|---|---|---|---|---|
| age | 118 | 1107932 | 605532 | 72 |
| <Other numeric columns> | <Other averages> | <Other random multipliers> | <Other random addends> | <Other group numbers> |

| l name | salary | age | GpNum | RecInfo | RowNum |
|---|---|---|---|---|---|
| Lee | 89000 | 55 | 72 | H | 10995 |

Step 6: Present the decoded result set to the application. (Remove the GpNum, RecInfo, and RowNum columns).

| l name | salary | age |
|---|---|---|
| Lee | 89000 | 55 |

FIG. 11C (REPRODUCED J1 TABLE)

| l_name | more col. | GpNum | l_name | GpNum | frequency |
|---|---|---|---|---|---|
| hf8$kL | ... | 1 | NULL | NULL | NULL |
| TubD'p | ... | 1 | NULL | NULL | NULL |
| Wd.bwx | ... | 3 | NULL | NULL | NULL |
| xrtQu7 | ... | 4 | NULL | NULL | NULL |
| xrtQu7 | ... | 4 | NULL | NULL | NULL |
| NULL | NULL | NULL | lj9drr | 1 | 1 |
| NULL | NULL | NULL | Cc3f7a | 1 | 1 |
| NULL | NULL | NULL | hlr7dw | 2 | 2 |
| NULL | NULL | NULL | 4J.det | 3 | 1 |

Rows 1–5: J1's 1st component
Rows 6–9: J1's 2nd component

*Step 3: Remove the encoding from the needed column (in this case, l_name) in both J1 components.*

DECODED J1 TABLE

| l_name | more col. | GpNum | l_name | GpNum | frequency |
|---|---|---|---|---|---|
| SmithS | ... | 1 | NULL | NULL | NULL |
| KellyK | ... | 1 | NULL | NULL | NULL |
| Russel | ... | 3 | NULL | NULL | NULL |
| SmithS | ... | 4 | NULL | NULL | NULL |
| SmithS | ... | 4 | NULL | NULL | NULL |
| NULL | NULL | NULL | Russel | 1 | 1 |
| NULL | NULL | NULL | JohnJo | 1 | 1 |
| NULL | NULL | NULL | KellyK | 2 | 2 |
| NULL | NULL | NULL | SmithS | 3 | 1 |

Rows 1–5: J1's 1st component
Rows 6–9: J1's 2nd component

RESULT SET

| l_name | more col. | GpNum |
|---|---|---|
| Russel | ... | 3 |
| KellyK | ... | 1 |
| KellyK | ... | 1 |
| SmithS | ... | 1 |
| SmithS | ... | 4 |
| SmithS | ... | 4 |

*Step 4. Loop over the J1 table on the client. For each row P in the second component of J1, find every matching row Q in the first component of J1. Repeat Q in the result set presented to user as many times as specified by the frequency count of P. (In this Figure, "SmithS" is repeated 3 times in the result set because it has a single occurrence in J1's second component and is found 3 times in J1's first component. "KellyK" is repeated twice in the result set because it's found with a frequency of 2 in J1's second component and has a single matching row in J1's first component. (The rest of the information in the result set comes from J1's first component because we are interested A1's rows of the INNER JOIN).*

FIG. 12B

SYSTEM AND METHOD OF ANALYZING ENCRYPTED DATA IN A DATABASE IN NEAR REAL-TIME

CROSS-REFERENCE TO RELATED APPLICATIONS

This application claims the benefit of U.S. Provisional Patent Application 61/326,405, filed Apr. 21, 2010, the disclosure of which is hereby incorporated by reference in its entirety.

FIELD OF THE INVENTION

The present invention relates generally to a system and method of querying an anonymized database. More particularly, the invention provides a method and system for querying an anonymized database without the need to decrypt queried data. Even more specifically, the invention provides a method and system of anonymizing a database such that it may be queried efficiently while still retaining the ability to not decrypt requested data.

BACKGROUND

As the amount of digital data created and processed by organizations continues to increase, the need to query and secure those data also grow. Data is thus often encrypted to secure it from improper access. A problem arises when the data is required for use by the proprietor or other legitimate users of the database. In order to perform an operation on encrypted data, it is typically requested from the database, decrypted, and only then can the operation be run, after which the results must be encrypted and returned to the database. The decryption and encryption steps consume vast amounts of processing resources, resulting in significant delays when working with encrypted data.

Typical architectures are network-based (e.g., client-server) database architectures. Multiple users, each with their own workstation, are trying to retrieve records from a central database. Typically, because the database is encrypted, the database private key, used for data encryption and decryption purposes, is kept on a network drive shared among the client machines. The client machines load the key from the shared network drive.

Some existing methods attempt to address data decryption issues by performing operations on encrypted data directly. However these prior methods suffer from the inability to offer virtually the same performance as users are accustomed to today when running against unencrypted data. In addition, these prior methods do not offer robust analytical capabilities over encrypted data.

Thus what is needed is a new encryption system and method capable of querying anonymized electronic databases and obtaining the same results as if performing the queries against the original, unencrypted data all while being done with little actual impact to query speed. As described, our approach considerably differs from typical database operations over encrypted data today. In most of the current schemes, data must be typically decrypted before queries can be run against them. We break with this limitation by permitting queries and analysis over encrypted data.

SUMMARY OF THE INVENTION

According to an exemplary embodiment of the present invention, a method and system which allows the querying of anonymized electronic databases while obtaining the same results as if performing the queries against the original, unencrypted data with little actual impact to query speed is provided.

According to another exemplary embodiment of the present invention, a method and system is provided which provides anonymization of data, methods to analyze the anonymized data, and a retrieval mechanism that returns the correct (unciphered) response to a user's query.

BRIEF DESCRIPTION OF THE DRAWINGS

FIG. 1 is a depiction of a system and method of identifying 5-element groups and as well as the number of tokens needed to "equalize" each token's frequency to that of its 5-element group's leader.

FIG. 2 is a depiction of a system and method of creating false rows based on the maximum number of "rows needed" across all the 5-element groupings created across all the string columns.

FIG. 3 is a depiction of a system and method of identifying 5-element groupings of individual character positions within strings and as well as the number of characters needed to "equalize" each position's frequency to that of its 5-element group's leader.

FIG. 4 is a depiction of a system and method of creating false rows based on the maximum number of "rows needed" across all the 5-element groupings of character positions in strings created across all the character positions within a given string column.

FIG. 5 is a depiction of a system and method of beginning to properly create false tokens based on substitution, as required in 5-element groupings for a specific column.

FIG. 6 is a depiction of a system and method of the resulting substitutions after tokens have been "equalized" within their 5-element groupings (e.g. the culmination of FIG. 5).

FIG. 7 is a depiction of a system and method of beginning to properly create false characters based on substitution, as required in 5-element groupings of character positions for a specific column.

FIG. 8 is a depiction of a system and method of the resulting substitutions after character positions have been "equalized" within their 5-element groupings (e.g. the culmination of FIG. 7).

FIGS. 11A-C are a depiction of a system and method of decoding a small result set on a client machine.

FIGS. 12A-B are a depiction of a system and method of showing how an INNER JOIN can be performed between two anonymized tables involving the X1 table (shown in FIGS. 11A-C).

DETAILED DESCRIPTION

Figure 9:
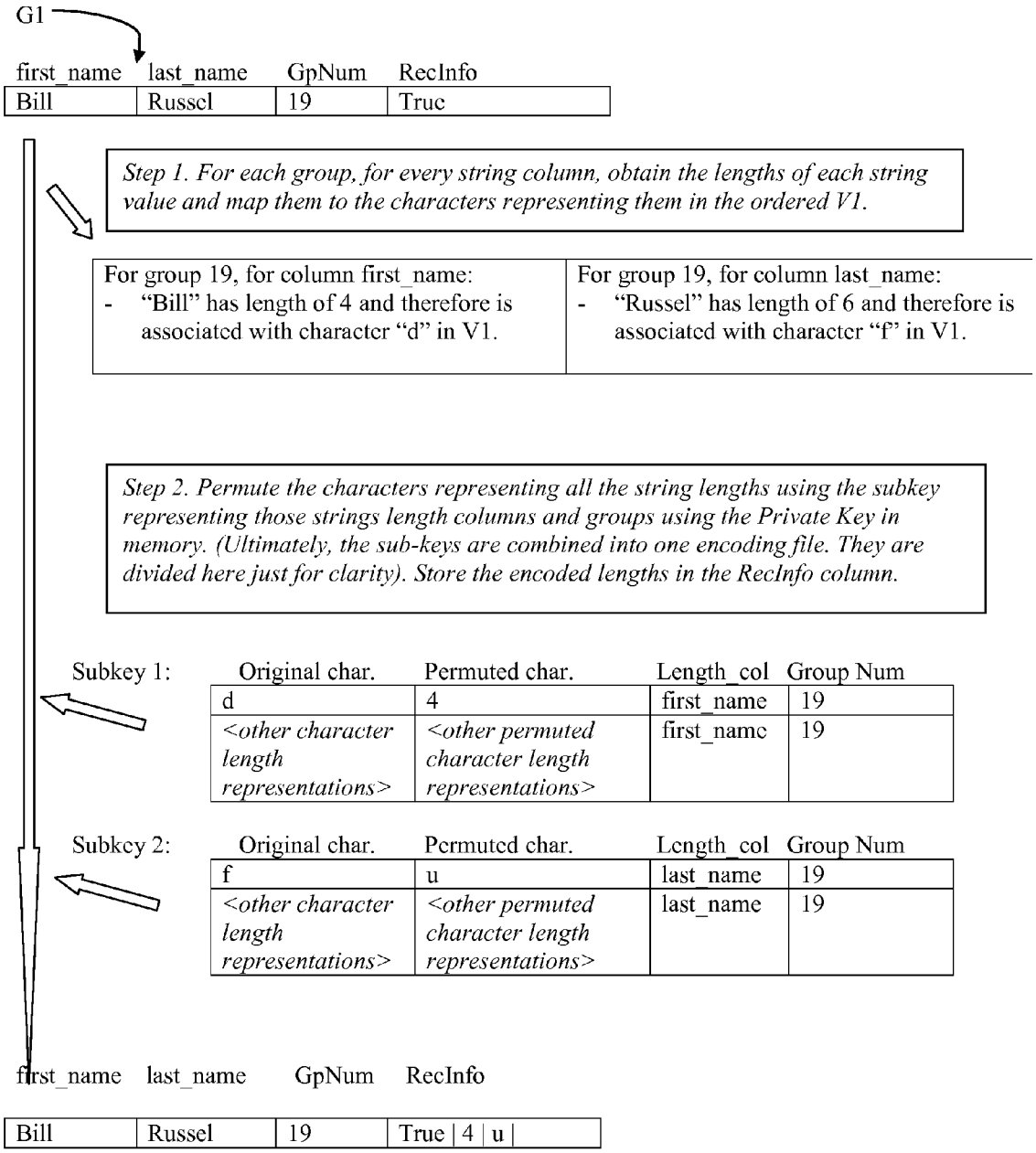
FIG. 9 is a depiction of a system and method of encoding the string lengths of a single "true" row.

In order to provide near real-time querying of encrypted databases, modules are provided to perform the necessary hardware and software functions to allow querying of encrypted databases without first decrypting the data. The modules are preferably implemented by software means, but may also be implemented by firmware or a combination of firmware and software. Preferably the database is housed on a server computer which is networked to one or more client computers or devices. When the database is anonymized in accordance with embodiments of the present invention, it does not require that it be decrypted prior to conducting analysis. To the contrary, SELECTs, UPDATEs, and various mathematical computations, can be done on the encrypted data and correct results returned to clients, after which they can be decrypted on the client. Thus, encrypted queries can be performed in near real-time. To accomplish near real time queries, queries are anonymized before being submitted to the server and anonymized results are then decrypted before being presented back to the user.

Certain preferred embodiments of the present invention are now described. As a first step, the database must be anonymized. For string values, this method securely anonymizes data at the level of individual characters yet allows for general queries and pattern matching to take place over the anonymized strings. For numbers, this method mathematically transforms values into obfuscated numeric values which will still allow some numerical computations to be done on the server while the rest of the calculations can be completed on the client. Maintaining almost the same speed of query performance is accomplished through the use of indexes. The encoding of strings and numbers involves normal textual and mathematical manipulations, allowing the full use of indexing as on normal, unencrypted databases.

The anonymization process works on a single database table at a time. It anonymizes all columns, not just those with "sensitive" fields such as Social Security Number or Last Name. Anonymizing all columns prevents the table from being subject to re-identification attacks which focus just on non-sensitive fields. String columns are handled differently from numeric column.

Now described is the anonymization of strings in accordance with embodiments of the present invention. Every value in a string column is separated into its individual characters. The method deterministically encrypts each character—i.e., transforms the same character into the same encoded character every time—but in a special way. Simply deterministically anonymizing such characters without any special treatment would immediately subject the anonymized data to a frequency analysis attack.

Now described are embodiments of the present invention presented by way of examples, including the worst-case scenario example of an intruder who has access to an unencrypted static copy of the original database. However, the embodiments of the present invention are not limited to protecting data from such an intruder and are able to afford similar or greater protection from other forms of intrusion, including insider threats, and outside threats who lack a copy of the original database. Thus, if an intruder obtained a copy of the original database, she could compute the frequency of any character in it. The frequency of the enciphered character will be the same due to the deterministic nature of the anonymization (transforming the same character into the same encoding every time), leading to fairly straightforward re-identification of characters. This re-identification is obviated by combining a deterministic process with the generation of a significant number of database records which contain appropriately created fake strings. The intruder will be significantly less able to carry out a frequency analysis attack because the randomly created characters will hide the frequencies of the original characters. A further layer of security is added by breaking the anonymized table into many independent "groups" and coding each character position within each column and each group independently. Such encoding also disrupts the intruder's ability to carry out a frequency analysis attack because across groups and across different character positions, the same characters will have different encodings.

Finally, the fake records will also prevent re-identification of original string values when the intruder is observing the number of rows being returned after various queries complete processing. That is, one wants to prevent an intruder from learning identifiers by seeing result set sizes. In result sets of embodiments of the present invention, fake records will be returned intermixed with real records. Thus, simply looking at the number of rows returned will not facilitate re-identification because result set sizes will not reflect accurate row counts related to the original queries.

Numeric values are protected by placing their records into the newly created groups, too. A mathematical function with different anonymization parameters for each numeric column and each group will be used to encode each numeric value. The randomization of the numeric values into groups, the fake rows which will also hide the frequency of the numeric values, and the randomness of the parameters used when computing the mathematical function will make it very difficult for an attacker to re-identify any of the numeric values he may see as well.

Preferably, anonymization is carried out in a series of steps in accordance with a preferred embodiment of the present invention described herein:

Anonymization Step 0 involves identifying the original database ("ODB" also referring to the original database possessed by the hypothetical intruder) and tables. The ODB typically consists of one or more tables, O1 ... Op. The ODB is transformed into the anonymized database ADB which will consist of the anonymized tables A1 ... Ap. The anonymization process works on each table using various temporary tables for the transformation. The transformation of an exemplary table O1 is now described which is converted into an exemplary anonymized table A1.

Anonymization Step 1 involves identifying all the alphanumeric symbols that make up the original database. The alphanumeric symbols will be used to anonymize the original database to preserve the data schema so as to not interfere with the operations of database applications. This step in the anonymization process involves asking the ODB owner, or scanning the tables O1 ... Op directly, to identify the symbol sets that make up the various columns in the ODB tables. This set, comprised of, for example, the letters a-z, the letters A-Z, basic punctuation marks, and digits 0-9, is stored in table V1. V1 is used to construct the data encoding/decoding keys and for several other purposes as will be described below. The same alphanumeric symbols are used during the anonymization process as the original plaintext symbols so as to not interfere with the current database applications.

Anonymization Step 2 sets the number of groups into which the anonymized table will be divided. The more groups the stronger the security as each group gets its own encoding/decoding key. Preferably, the number of initial groups is set to five. The number of groups is preferably automatically expanded to about 30 groups in subsequent Anonymization Steps. That is, the next step in the anonymization process, Anonymization Step 2, sets the number of groups into which O1 will be divided. The more groups created the stronger the anonymization is because the rows in each group will get their own encoding key. (The more groups that are created, in fact, the closer the scheme approaches to that of a random pad). In this embodiment of the present invention, it is recommended to set the number of groups to 5 for any table to be anonymized because additional groups, e.g., more security, will automatically be created in subsequent Anonymization Steps. Based on later Anonymization Steps, 5 groups will be doubled to 10 groups as new "true" groups (i.e. those containing the original data from the ODB) are formed to prevent frequency analysis attacks on strings and characters within groups, as will be shown in Anonymization Steps 5 and 6. The group count of 10 will then be increased to a group count of about 30 as about 20 "false" groups (i.e. those containing the fake rows the anonymization process introduces) will be added to the table, too. These false groups make it very difficult to carry out a frequency analysis attack on strings and characters on the whole table, as will be shown in Anonymization Steps 7 through 9.

In embodiments of the present invention it is also possible to set the initial group number even higher, this generates an even higher final total group count, hence making A1 even more secure with minimal loss of performance. Increasing the number of groups in our own testing has, so far, only shown small performance differences.

In Anonymization Step 3 anonymizing the first database table by copying it into a temporary table is performed. Besides the original table's columns, the temporary table introduces special columns so that client workstations can properly query the anonymized data after anonymization. Separate the temporary table into the initial number of groups as configured in Anonymization Step 2. That is, in Anonymization Step 3, O1 is copied into temporary table B1. Special columns are introduced in B1 to allow for client machines to subsequently query the anonymized data. The first column added, GpNum, holds the number of the group to which a given row belongs. Among other things, this column is used to discard rows from result sets that belong to false groups and retain rows that belong to true groups. The second column added, RecInfo, contains the lengths of each string value in that row, encoded as a character within V1. This column is used to trim string values in result sets so that the string values with proper original lengths can be shown to the user after they are returned to the client from the server. The third column added, RowNum, is a counter representing the row number for the row. Among other things, it is used to determine if a numeric value in a result set row was originally an outlier so that its proper outlier value may be restored before it's shown to the user.

Next, B1 is divided into the initial number of groups (for example, 5) as set in Anonymization Step 2. Substantially the same number of rows in each group in the anonymized table is maintained so that differing group row counts do not assist an intruder in any of his or her re-identification efforts. Hence, the GpNums of B1's rows are updated to roughly evenly divide them among all possible initial true groups.

Table R1 is also created in this Anonymization Step. This table is used to process the DELETE command in the scheme. R1 will hold the RowNums for those rows that are scheduled for deletion, and any rows in R1 will not be incorporated into any application query against the anonymized database because the rows will ultimately be erased.

Anonymization Step 4 creates uniform length strings within every string column so that anonymized values can't be guessed due to their lengths. Preferably, a uniform relative length is created for all the values in every string column. Thus, an intruder would not be able to compare his O1 copy to A1 and identify records in A1 due to equal string lengths. To create uniform lengths in each column, the length of its longest string is computed. Then every string value in the column is padded with itself, character by character, in order, wrapping back to the beginning after the end of the string is reached, until the total length equals the identified maximum length. Finally, the RecInfo column for each row in B1 is set to indicate it's a "true" row as these rows are copies of the original O1 values.

Anonymization Step 5: to make a frequency analysis attack on characters or strings within groups more difficult, rows having the most popular leading characters in a strategically chosen string column are exchanged with rows from randomly chosen groups. Preferably, this involves a potential "re-grouping" of the rows in B1 to prevent a character or string frequency analysis attack within groups. A column having the most popular values within B1 is chosen and used as the basis for identifying popular strings that can be moved to other groups. Such a column is used as the basis for segregation because in a frequency analysis attack its values can be more easily recognized. An intruder could try to map its unique values to the same unique values in his O1 copy. However, moving the popular and therefore more identifiable values of this column to other groups better hides those values. If no uniquely-valued column exists in B1 and the distribution of values in all string columns is equivalent, a random column for segregation purposes is chosen. Within each group, when examining the most uniquely-valued column, rows containing characters in the first position that are significantly more frequent than characters in the first position of other rows are identified. The larger sets of these popular rows are broken into smaller sets and each such smaller set is moved to randomly selected groups. Rows from the random receiving groups are moved into the group currently analyzed. The reason for breaking up sets of rows before moving them is to prevent the popularity of the leading characters in the uniquely-valued column from arising within new groups. At the same time, we keep the number of rows in all groups relatively equal to prevent the insider from guessing which rows have more popular characters based on different group row counts.

The following is an exemplary illustration of this Anonymization Step 5. Imagine B1 has 200 rows and is comprised of 20 groups, each having 10 rows. The column last_name is the most uniquely identifying column and we are working with group 12. A histogram of the first position of the last_name column of group 12's rows shows that there are 3 T's, 3 H's, 2 R's, 1 W, and 1 F in that character position (representing 10 rows). In this illustration the anonymization process utilizes the median to identify popular characters. In this case, the T's and H's are "popular" because their frequencies are above the median. The set of 3 rows associated with the T's are broken into random smaller sets, say one having 2 rows and another having 1 row. We pick one random group in 20 into which to move the 2-row set into; say we pick group 17. The GpNum values of the 2-row set are changed to 17. At the same time, the GpNum value of 2 random rows from group 17 is changed to 12, to preserve row counts in groups. Likewise, we randomly pick a group to move the 1-row set into; say group 2. The GpNum value of this row is changed to 2. Also the GpNum value of 1 random row from group 2 is changed to 12. The same random separation and exchange happens with the rows having the leading H's in their last_name column as well.

Anonymization Step 6: to make re-identifying characters or strings more difficult within groups, three strategically chosen columns are selected. All the rows found by identifying the most popular leading characters of the three columns are moved to newly created groups to dilute the popularity of string values. This step in the anonymization process is to create new groups for rows having popular string values across several uniquely-valued columns. Like in Anonymization Step 5, an intruder could also identify popular string values by combining several of the most uniquely identifying columns and mapping the implicated identifiers to his O1 copy, thereby facilitating the re-identification of the unique anonymized values. Thus, this step identifies columns which contain the most unique values to separate the popular rows from the unpopular ones. The popular rows are then moved out into new groups. As an example, three columns are picked that, when combined, will produce the most unique possible values in B1. Note, if no uniquely-valued columns exist in B1 and the distribution of values in all string columns is equivalent, three random columns for segregation purposes are chosen. (In testing, the Last Name, First Name, and Diagnosis columns contained the most such unique values). A combined histogram of the first and second character of each of the three string values across the three columns is built. From every set of high-frequency rows within the groupings, the number of rows equal to the median frequency of the histogram, or the first frequency found above the median, is moved to newly created groups. By removing a substantial chunk of popular rows from a group, we further disable the intruder's ability to identify the frequencies of unique string values within groups because those frequencies have been substantially undercut. At the same time, the newly-created groups contain rows with identical frequency counts of the character groupings just described. They become also essentially indistinguishable from a re-identification perspective because within the receiving groups the frequencies of their key string values are the same.

The following is an illustration of this Anonymization Step. Imagine B1 has 200 rows and is comprised of 20 groups, having 10 rows in each group. The columns last_name, first_name, and diagnosis are the most uniquely-identifying columns in B1. Suppose we are working with group 8. Table 1 below shows a combined histogram of the 1st and 2nd position of column last_name, the 1st and 2nd position of column first_name, and the 1st and 2nd position of column diagnosis:

Group 8 has become smaller but because we are doing this for all 20 groups in B1, they also shrink, making their sizes not helpful to an intruder from a re-identification perspective. Group 24, in the meantime, now has 6 rows. Within this group, the combined frequencies of the leading characters of the most uniquely-identifying columns in its rows equal, i.e. they are 2. Therefore, re-identifying the string values in this group also becomes very difficult for an intruder.

Anonymization Step 7 begins to make frequencies of string values indistinguishable in the temporary table. Start to create false rows which when combined with true rows will make frequencies of different string values indistinguishable within result sets derived from this table. Anonymization Step 7 creates equal frequencies of different full-length string values to further make differentiating full-length string values via a frequency analysis attack very difficult. Referring now to FIG. 1, for each string column in B1, a histogram of full-length string values—called tokens from now on—is recorded in table E1 in order of descending frequency. Grouping tokens into sets of 5, the number of rows needed to be added to each token to make it equal the most frequent token in its 5-group set is also recorded in E1. If there are less than 5 tokens in a token's "5-group" set (e.g. it's the last grouping in the histogram), then we record just for those tokens how many rows compared to their leader are needed to make their frequencies equal. Next, the "rows needed" column is aggregated for each column in B1—meaning, it is totaled for each column across all of the column's rows in E1. The largest such aggregated "rows needed" value is found. FIG. 1 below shows an example of a small 3-column B1 (without the padding of string values for clarity), the associated E1 table, and how one identifies the largest aggregated "rows needed" value.

TABLE 1

| 1st pos. last_name | 2nd pos. last_name | 1st pos. first_name | 2nd pos. first_name | 1st pos. diagnosis | 2nd pos. diagnosis | freq. | GpNum |
|---|---|---|---|---|---|---|---|
| s | m | j | o | c | a | 3 | 8 |
| s | m | m | a | d | i | 2 | 8 |
| j | o | m | i | d | i | 2 | 8 |
| h | o | s | t | h | i | 1 | 8 |
| p | o | l | i | c | a | 1 | 8 |
| f | r | r | o | c | o | 1 | 8 |

The median in the frequency column is 1.5 and the first frequency greater than this number is 2. We create a new group to transfer the popular rows to. For example, we create group 24. Therefore, 2 of the 3 rows from group 8 matching the first grouping in the table 1 above have their GpNum values changed to 24 in table 2 below. Similarly, both rows from group 8 matching the second grouping in the table above have their GpNum values changed to 24. Finally, both rows from group 8 matching the third grouping in the table above have their GpNum values changed to 24. Table 2 below shows the histogram of the results after this transformation:

Referring again to FIG. 1, the first_name column has the highest aggregated "rows needed" value—a total of 7 rows needed. Random rows are copied from B1 into temporary table C1 equaling this value (e.g., 7, in this case). The rows will become some of the "false" rows of A1. Thus preventing the intruder from surmising which tokens are requested or returned based on result set size. Tokens will be replaced in the columns in C1 based on the "rows needed" parameter to ensure that when tokens in any 5-group set from E1 are requested, result sets will return true and false rows whose total number approximately equals, thus interfering with any

TABLE 2

| 1st pos. last_name | 2nd pos. last_name | 1st pos. first_name | 2nd pos. first_name | 1st pos. diagnosis | 2nd pos. diagnosis | freq. | GpNum |
|---|---|---|---|---|---|---|---|
| s | m | j | o | c | a | 1 | 8 |
| s | m | j | o | c | a | 2 | 24 |
| s | m | m | a | d | i | 2 | 24 |
| j | o | m | i | d | i | 2 | 24 |
| h | o | s | t | h | i | 1 | 8 |
| p | o | l | i | c | a | 1 | 8 | re-identification attempts. New groups are created in C1 so that the row count in each false group is equal roughly to the row count in the original B1 groups. We want to maintain group row counts to prevent the intruder from understanding which are the false or true groups due to an unequal number of group rows. The RecInfo values of all the rows added to C1 are labeled as "false" because these will become false rows in A1. FIG. 2 continues the example of FIG. 1. (It shows how the 7 random rows are copied from B1 into C1. We assume that B1 has approximately 3 rows per group, therefore, C1 must maintain such row counts in its newly-created false groups, too).

Anonymization Step 8: To undermine frequency analysis attacks on individual characters, begin to make frequencies of characters within strings indistinguishable in the temporary table. Begin to create false rows so that when combined with the number of true rows, frequencies of different characters in the same positions become indistinguishable within result sets derived from the anonymized table.

In each string column, the same technique as for tokens is applied to individual characters. For each string column, a histogram of frequencies of individual character positions within that column in order of descending frequency is built and stored in table F1. Grouping these positions into disjoint sets of 5, the number of rows needed to be added to each position to make it equal the most frequent position in its group is also recorded in F1. If there are less than 5 positions in the grouping (e.g. the last group in the histogram), the number of rows needed when compared to their leader is computed just for those positions. The values from the "rows needed" column are aggregated for each position and the maximum aggregated "rows needed" count is found. FIG. 3 illustrates the tasks of this Step. It shows the column first_name taken from a B1 table (unpadded for clarity and different from the B1 used in FIGS. 1 and 2); the resulting F1 table; and how to identify the aggregate maximum number of "rows needed" value.

Still referring to FIG. 3, the highest aggregated "rows needed" value comes from the second position, i.e., 14 rows are needed. Random rows are copied from B1 into temporary table D1 equaling the most such rows needed (e.g., 14 here). These rows will become additional "false" rows in A1. The intent is to considerably undermine re-identification of characters based on result set sizes by making character frequencies within result sets indistinguishable from those of their peers in their 5-group sets. New groups are created in D1 so that the row count in each is equal roughly to the row count in the original B1 groups to preserve group row counts. The RecInfo values of all the rows added to D1 are labeled as "false". FIG. 4 below continues illustrating the example of FIG. 3. (It shows how 14 random rows are copied from B1 into D1. Note that because B1 only has 9 rows, some rows must be (randomly) sampled twice to produce the 14 rows. We assume that B1 has approximately 3 rows per group, therefore, D1 must maintain such row counts in its newly-created false groups, too).

Note, although in this embodiment we focus on creating 5-elements sets to undermine frequency analysis attacks on tokens and character positions, this is a configurable parameter in the embodiments of the present invention. For example, one could create 10-element, 4-element, etc. sets depending on how much security is needed in the ADB.

Anonymization Step 9: "Equalize" the string and character values set up in Anonymization Steps 7 and 8. Among the false rows generated in those two Steps, substitute the needed string and character values to make string and character values almost equal in frequency within their respective 5-element groupings.

That is, Anonymization step 9 is the process of "equalizing" the tokens and positions set up in Anonymization Steps 7 and 8. Using E1 and F1, the tokens and positions specified therein will replace other tokens and positions in C1 and D1, respectively, guided by the former tables' "needed rows" columns.

In the case of tokens and E1, replacement starts using the top (e.g., most popular) token in E1. As substitutions continue, if all E1 tokens are exhausted, yet there are rows in C1 that have not yet received substitutions, substitution continues in a round-robin fashion. That is, tokens are equally distributed among the remaining false rows in C1. Every token in E1 for the column, starting from the top and moving down one token at a time, is used once. If the bottom of E1 is reached once again before C1 is exhausted, the process wraps back to the top of E1 and begins with the top token again.

As an illustration, imagine C1 contains 7 rows, based on the example in FIGS. 1 and 2. In the example there, the first_name column had the highest "rows needed" parameter, resulting in 7 rows in C1. After we create the 7 rows, suppose that, as part of creating false tokens across all of C1, we have now reached the point of processing string column last_name. It only requires 6 rows to be replaced. FIG. 5 shows the subset of E1 dealing with last_name and the C1 table produced from B1. Both tables are the same as in FIG. 1, reproduced here just for convenience.

The substitution process starts with the first row in C1. Moving down E1 and C1, the last_name column in C1 is systematically replaced by 0 Jones's, 1 Smith, 1 Lurie, 2 Jackson's, and 2 Felix's. Because the total number of token replacements via E1 is only 6, for C1's row 7 we go back to the beginning of E1. Row 7 in C1 is replaced with 1 Jones. At this point replacement is stopped because we have substituted for all 7 rows in C1. FIG. 6 shows the transformed C1.

The same substitution approach is taken for character positions. As an illustration, and continuing with the example from FIGS. 3 and 4, imagine D1 has 14 rows, based on the maximum "rows needed" column of position 2 from that example. We have created the 14 rows, and now, as part of creating the fake positions across all of in D1, we have reached the point of working with the 1st position of column first_name in F1. It has a smaller aggregated "rows needed" value compared to its position 2. FIG. 7 shows a subset of F1 with the details of position 1 and the associated D1 table. Both are the same as in FIGS. 3 and 4, reproduced here just for convenience.

Starting at the top of D1 and the top of F1, we systematically replace the first position of the first_name column in D1 with the characters in F1. We substitute in 0 J's, 1 R, 1 S, 2 B's, and 2 V's. Because we have only substituted 6 rows, we return to the top of F1 and now begin substituting in a round-robin fashion. We substitute in 1 J, 1 R, 1 S, 1 B, and 1 V. Our current total, 11, is still 3 short of the needed 14 rows. We start at the top of E1 once more and substitute in 1 J, 1 R, and 1 S, as which point we stop replacement. We have now substituted for all of D1's rows. FIG. 8 shows the transformed D1. Finally, after all the tokens and positions have been substituted in the ways described above, C1 and D1 are appended to B1.

Anonymization Step 10: randomly shuffle the existing groups in the table to further obscure any potential group order. Also create a temporary table which will identify which groups contain false and true rows. That is, this Step randomly shuffles the groups created in B1 to further scramble any potential previously-created group ordering. A new table, G1, is created with new group numbers representing the true and false groups (of course, the true rows are maintained in the true groups while the false groups are maintained in the false groups). Also, a temporary table, Y1, is created to just list which group numbers contain true rows and which contain false rows. This table becomes part of the A1 table private key, part of the database private key, and is used to discard false rows when result sets involving A1 are returned to the client from the server.

Anonymization Step 11: begin anonymizing the numeric columns. Each number is converted to a different number through the use of a consistent mathematical function but with specially-chosen randomized parameters. That is, this Step (11) handles O1's numeric columns. Numeric values are transformed into other numbers using a special monotonic mathematical function. Every numeric column in G1 is processed. For every group, three values are obtained: the average of the numeric values for that group, a random number—called a random multiplier from now on, and another random number—called a random addend from now on. (In our testing for this scheme, we generated a random multiplier in the range of 500,000 to 1,500,000). To encode a numeric value within a group, the average of values in that group is subtracted from the number, the result multiplied by the random multiplier, and to this result the random addend is added. As we will see, such an encoding allows for a various computations like SUM, AVG, subtraction, etc. to be handled to a considerable degree by the server, although requiring some final computations on the client. At the same time, the security of numeric values is maintained because every group will have a random collection of rows. The average of values, a key contributor to the encoding, becomes a pseudo-random number, different from group to group, undermining a frequency analysis attack on the numbers. In addition, the random multiplier and random addend differ from group to group so that the anonymized values have little relationship to each other. One value could have been bigger or smaller than the other in O1, a relationship which the random multiplier and random addend especially help break in G1. The average, random multiplier, and random addend are different for each numeric column as well. All this randomization makes an intruder's ability to re-identify any particular column value, when he sees A1, very difficult. Further, as discussed previously, the number of groups into which O1 is divided can always be increased, creating even more challenges to numeric re-identification. The random multiplier, random addend, and average for each group and column are stored in a table which will become part of the private key. It will be used to "decrypt" the numeric values, or computations involving them, on the client when result sets are returned to the client by the server.

Anonymization Step 12: handle the numeric outliers by transforming them into values within the normal range of their groups. The original values are recorded so they can be later restored within results sets on the clients. That is, this anonymization step (12) involves properly managing numeric outliers. Despite the availability of groups and the mathematical function, certain numeric values may be so different from average that even placing them into groups and encoding them via the average, random multiplier, and random addend will still not hide their value. They look extremely different from the groups they are in, if not the entire A1 table. To prevent the re-identification of such values, in G1, outliers are transformed to numbers which are within the range of the rest of their respective groups. The original values are recorded in a file to be part of the A1 table private key for subsequent restoration within result sets on the client. Before the mathematical function is applied to any numeric value, the number is compared to a number three standard deviations below and three standard deviations above the average of all of the numbers in its group. If the value is at least three standard deviations below or above the average in its group it's considered an outlier and its complete row is recorded in temporary table H1. Its value in G1 is transformed into a value randomly selected from the three sigma range within its group. The point of keeping the outlier values in G1 rather than removing their rows altogether is to preserve the statistics that the other columns within these rows may support. The columns can support the movement of rows to other groups based on character frequencies, etc., as explained in earlier Anonymization Steps. It also becomes more difficult to identify the next outlier values after the most extreme outlier values are transformed if the transformed outliers could randomly take on those next-largest outlier values. The intruder does not know if the "outlier" value he sees is the next-largest outlier or the largest outlier made to look like the next-largest outlier. H1, containing the original outlier values and the values that replaced them, becomes part of the A1 table private key to be used on the client. Note that after an outlier value is modified it is then encoded in the same way as any other number as described in Anonymization Step 11: the group average is subtracted from it, the result multiplied by the random multiplier for its column and group, and the random addend is added to this result based on the column and group.

Anonymization Step 13: create the random encoding/decoding key for the table and use it to permute each character within each string value in the table. This Step involves the construction of the encoding/decoding key for A1 that will be used to obfuscate every character in every string column in A1. A sub-key will be constructed for each group and character position in G1. The combination of all the sub-keys is the complete key that becomes part of the A1 table private key files that is made available to the client machines. For each string column, for each position, for each group in G1, we randomly select how all characters in that position will be permuted into other characters. That is, we don't just permute actual characters that exist in G1 but we create a random permutation of all possible characters, relying on V1, constructed earlier, to supply both the allowed domain and range for the permutation. This is done to make encoding and decoding easier on the client because the A1 table private key has more structure and hence more efficient indexing properties. Table 3 below illustrates small portions of two sub-keys, representing how characters "a" through "e" for column last_name in position 2 in groups 27 and 45 are permuted in a fictitious G1:

TABLE 3

| Original char. | Permuted char. | Column | Position | Group Num |
|---|---|---|---|---|
| a | h | last_name | 2 | 27 |
| b | A | last_name | 2 | 27 |
| c | 4 | last_name | 2 | 27 |
| d | w | last_name | 2 | 27 |
| e | $ | last_name | 2 | 27 |
| a | u | last_name | 2 | 45 |
| b | D | last_name | 2 | 45 |
| c | h | last_name | 2 | 45 |
| d | 3 | last_name | 2 | 45 |
| e | P | last_name | 2 | 45 |

We also create a separate group, i.e., a separate sub-key, for rows which are INSERTed after G1, in the final form of A1, is placed into production. To prevent the intruder's guessing of encodings within existing groups by the introduction of new statistics that might somehow assist in re-identification, we place a new row and its associated statistics into a new group.

We also create a random "average" value, a random multiplier, and a random addend for each numeric column and a new sub-key for each string length column to be stored in the RecInfo column for the new INSERT group. (The encoding of string lengths is discussed below in Anonymization Step 15). Note that isolating newly INSERTed rows in their own group certainly tells the intruder that that group number contains true rows. He can focus his re-identification efforts there. However, the intruder cannot know column values of newly INSERTed rows per our threat model. As mentioned in the very beginning, the intruder can only copy the ODB before the anonymization takes place, not afterwards. His copy of the ODB will not have the newly INSERTed rows and he cannot compare anonymized values of these rows with any original plaintext values. He can try to use published statistics—from the Census Bureau, etc.—to mount a frequency analysis attack on tokens or character positions. But given the difficulty in re-identifying the ADB when he has a copy of the ODB, as has been (and will continue to be) shown in this note, breaking the security of the anonymized rows without having the original plaintext values makes re-identification even more difficult.

Still, it also is possible to re-anonymize the database, i.e. create a new ADB, whenever the database owner wishes. The new ADB re-distributes the rows from the INSERTed group into regular groups so that the intruder will not know which groups contain the new rows or what their anonymized content even is. The frequency of re-anonymization can be tied to how many rows are INSERTed into the ADB within some fixed period. If the number of new INSERTs, say, per month, is high, re-anonymization can be more frequent, for example, possibly every few weeks. If the number of new INSERTs is low, re-anonymization can be less frequent, happening, say, once per quarter. (Please see our Implementation Performance Results discussion at the bottom of this note describing when to re-anonymize the ADB).

Next, using the sub-key mappings, each character in G1's string values is permuted into its encoded form. Finally, all the sub-key mappings are combined into one encoding file to be placed into the A1 table private key.

Anonymization Step 14: encode the string lengths of every string value by permuting them into a character in the domain of the ODB and store the encodings in the temporary table. In other words, in this Step, we finish string column processing. The length of each string value is recorded in the RecInfo column of its row. Because the lengths are numeric one could encode them just like numbers more generally. However, this would preserve the order of the encodings within a group because the mathematical function is monotonic. Preserving the order could give an intruder more information about which strings belong to which group. He could compare A1 with the ordered string lengths he has in his O1 copy which could facilitate some of his re-identification efforts. Therefore, more preferably, because one never needs to know the ordering of string lengths during anonymization, the encoding mechanism is the permutation of string lengths into characters in the ODB which are stored in the RecInfo column. Each string column length obtains its own permutation based on the group it's in and the string column it's associated with. Preferably, V1 is relied on. A given string length is mapped to the ordered symbol set in V1 to first identify the character associated with the length of the string. Then we map this character into V1 again to encode the length. As an example, imagine V1 is comprised of 62 characters: the lower case characters, the upper case characters, and the digits 0-9, ordered in this specific way within V1. To encode a string length of 4, we find the character the length is associated with: in this case, it's the lower case "d", the fourth character from the start of V1. Then we permute "d" into another character in V1, for example, "R". Such permutations, sub-keys just like the regular encoding of characters described in Anonymization Step 13, are combined and stored in the encoding file of A1's private key. Because strings lengths should, in general, be small, a typical string length should "fit" within the symbol set of a typical V1. If some string lengths don't "fit" within V1, we could arbitrarily increase the size of our encoding space to any representation. For example, if we need string lengths of up to 10,000 we could create a permutation matrix mapping each length 1-10000 to a 3-position lower-case character value, for example, "dgq". Because we could arbitrarily represent $26^3$, or 17,576 values, using such a representation, using this construction would cover the needed 10,000 character lengths using the symbols in V1. This permutation matrix becomes part of the A1 table private key.

For each group, for each string column, each string length value is permuted as described above. These encoded lengths are concatenated, separated by specially marked delimiters, and placed as one long string into the RecInfo column. That is, they are appended to the flag indicating whether the row is true or false that is already present in that column. FIG. 9 illustrates how a small part of a 2-column G1 having a single "true" row in one group is transformed to contain encoded string lengths. (In the example, we assume the size of V1 is 62 characters. V1 contains the lower case characters, the upper case characters, and the digits 0-9, ordered in this particular way. The sub-key files are separate just for clarity. Ultimately they are combined into one encoding file). Finally, a new table, A1, which ultimately becomes the anonymized representation of O1, is created which contains everything from G1 except for the true/false row indicator in the RecInfo column.

Anonymization Step 15: create indices within the anonymized table to improve query performance. The next anonymization Step, 15, is to create indices on the anonymized table to improve query performance. Because simple textual and numeric manipulations are used to encode the plaintext data in A1, many of the indexing functions of the underlying database engine work on the anonymized data. This embodiment creates a non-clustered index on each string column in A1 to speed the processing of queries. In addition, because groups play a key role in extracting data, on numeric columns, a multi-column, non-clustered index is constructed with the GpNum column being the leading column in each such index. A single clustered index comprised of, in order, the GpNum, RowNum, and Last Name columns, is also constructed to further enhance query performance. Indices are not created on the RowNum or RecInfo columns. When we tested with indices on these two columns, they appeared to slow down rather than speed up queries. We also create a special index on the R1 table. We want to ensure that only unique RowNums are inserted into it. We create a UNIQUE index on R1 and also specify that this table should ignore any duplicate RowNums insert attempts, the motivation for which will be explained when we discuss the DELETE command later on. (In the Microsoft SQL Server 2008 environment, which is our testing environment, ignoring duplicate rows means that the index is created with the IGNORE_DUP_KEY=ON parameter). At this point, we are finished with O1 and it can be detached and stored for later reference. Table A1 is ready to be used by the database application(s).

Anonymization Step 16: anonymize the other tables of the original database, following the steps similar to Anonymization Steps 1 through 15. To handle the other tables of the ODB, O2 . . . Op, a similar process to the one described in Anonymization Steps 1 through 15 is undertaken. If these tables do not need to be JOINed on any columns to each other or to O1, the anonymization process for these tables becomes a two step process. To speed table anonymization and the loading of the database private key into memory on client computers, some of the encodings used for A1 may be used to encode columns in the other Ai. The appropriate number of groups is chosen for tables Oi independently of O1 and the anonymization of Oi is done using Oi's data. However, when it comes to choosing the average, random multipliers, and random addends for Oi's numeric columns and the sub-keys for Oi's string columns, the database script checks table A1's and table Ai's columns. Every Ai column that has an analogous column in A1 can use the average, random multipliers, random addends or character encoding for that A1 column. Anonymization steps 1 through 15 have already equalized the frequency of tokens and character positions of Ai strings. The shuffling of the values in numeric columns into random groups and the creation of false numeric values—when false records were created during string and character "equalization"—masks the numeric values as well. Hence, the average, random multipliers, random addends, and sub-keys—the final overlays over the true anonymization performed earlier—, can be re-used. If the number of groups in some Ai is greater than the number of groups in A1 then new numeric and string encodings will have to be created for those groups. Also, for those Ai columns that have no equivalent in A1, the average, random multipliers, random addends, and sub-keys are chosen independently as described in Anonymization Steps 11 and 13, respectively. Each position and numeric value in each group is encoded either using A1's private key or Ai's private key. Each table Ai also gets its own Ri table to assist with managing DELETE commands. Indices are also created on the Ai as for A1. If some of Ai's columns use the same encodings as analogous A1 columns, the private key files associated with those encodings do not need to be stored on the shared network drive. Clients will rely on A1's private key files to encode and decode those Ai columns. Otherwise, all the Ai private key files used to encode queries and decode the results targeting the Ai are installed on the shared network drive to be accessed by client machines.

If a table Oj must be JOINed on one more or more columns with Oi, which has already been anonymized earlier, a somewhat different procedure is undertaken. Imagine we know which columns will be used for the JOIN prior to anonymizing Oj. The columns used for JOINing Oj must be anonymized in the same way as the corresponding columns in Oi because strings must match when compared. Although our JOIN process can handle multi-column and multi-table JOINs, we'll use the following simpler example to illustrate how JOINs are handled.

Now, suppose one wanted to JOIN O2 to O1 and only one column will be used for JOINing. O2 is copied into temporary table B2 which will similarly have the new RecInfo, GpNum, and RowNum columns created. The same strings in B2 must be padded as they were padded in B1 because we may be doing full-length string comparisons during the JOIN. Because the padding mechanism is deterministic—i.e., appends the same value over and over, character by character, until the maximum length of the string value is reached—tokens that are identical between B2's and B1's JOIN columns will be therefore padded the same way.

Figure 10:
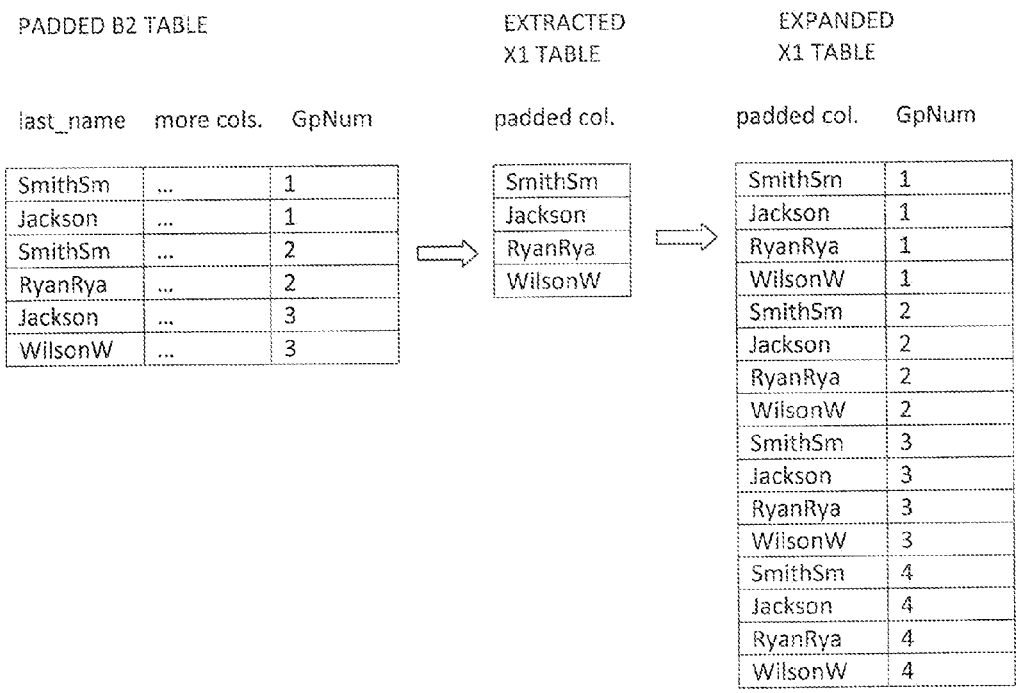
FIG. 10 is a depiction of a system and method of constructing a sample X1 table, used for JOINing two anonymized tables.

Next the unique plaintext padded values from the JOIN column in B2 are recorded in a separate table, X1. Unique X1 values are reproduced within X1 as many times as there are groups in A1. Such a construction of X1 will allow the extraction all potential rows from A1 and A2 when they are JOINed across their different group encodings in any JOIN query. Obtaining such rows will, in turn, allow one to rebuild the JOIN result set on the client. This is discussed in more depth later on but, essentially, X1 acts as a bridge, allowing one to return to the client all relevant rows from A1 and all relevant rows from A2. Using these data, the driver then finalizes the presentation of the JOIN result set on the client. FIG. 10 illustrates the construction of X1. (It shows how the X1 is extracted from a small 3-group padded B2 and then how it's expanded based on the associated (and not shown) 4-group A1).

How the X1 table is used to handle JOINs is discussed later on.

Note, if the JOIN column(s) are not known ahead of time and are only later determined, the anonymization steps related to O2 can be done when the columns for the JOIN are determined. A re-anonymization of O2 will have to be done as follows: O2 can be retrieved from archived storage. Alternatively, after O2 is constructed it can be decoded and the re-anonymization done on the resulting plaintext table.

Next, the same steps as for O1 are followed for O2. The same number of groups as for A1 is selected to construct A2. The group number must be preserved because we want to preserve the encodings for the column on which the tables are JOINed. All other steps—with regard to moving rows to new groups based on character frequencies; grouping string values and individual characters into 5-element groups; etc.—are done as before based on O2's data. The final groups of B2 are compared to Y1, the table created earlier indicating which are the true and false groups in A1. The true and false group numbers of B2 are converted to, respectively, the true and false group numbers of A1 so that the group-based encodings for JOIN purposes can be maintained. Note, even if O2 is very small or very large and generates less or more groups compared to O1, respectively, this is acceptable because our driver can still construct a JOIN query to return appropriate rows of the two tables implicated in the JOIN to finalize the presentation of the result set on the client. Once again, for faster processing any other numeric and string columns in O2 analogous to those in O1 can use the same average, random values (multiplier and addend) and encodings as for each group in O1. For any different columns, the numeric and string columns must be transformed with independently generated average and random values (multiplier and addend) and encodings. In either case, the X1 table used for JOINs is encoded using the same encodings as that of its counterpart column in A1. Indices are ultimately created on A2 as for A1. Table A2 is now ready to be placed into production.

If tables O3 . . . Op are also candidates for JOIN, their anonymization follows the same steps as just described for O2.

Tables A2 . . . Ap are now created and can be placed into production.

Placement into Production

To place this scheme into production, in accordance with embodiments of the present invention, the ADB is made accessible to all the users that need it. A driver is installed on each appropriate client workstation. The application(s) that access the ODB are re-configured to point to our driver instead of the ODBC driver they currently use.

The database private key is made available to all clients. The database private key is composed of the Ai table private key files and general database files. The following are the private key files for each specific Ai in the ADB:

1. The V1 table, indicating whether a particular group is true or false.
2. The encoding file describing how each character position is encoded for each group in each string column. This file also describes the encoding for each string length "column" in each group.
3. The file describing the average, random multiplier, and random addend for each numeric column in each group.
4. The H1 table, describing the original and modified numeric outlier values in certain rows.
5. The file containing the maximum lengths of each padded string column.
6. The file describing how many rows there are in the entire table.
7. The file describing how many groups there are in the table.

The following are the general database files:
1. The V1 table, containing the domain of the characters in O1 . . . Op.
2. The file describing how many rows the database server can handle within an anonymized subquery whose components are linked by OR statements. (This is further explained in the "Constructing Anonymous Queries" section).

These nine files must be placed on the shared network drive that all clients access, as discussed in the beginning of this document, from which all clients can obtain them.

Encrypted Operations
Query Re-Write by the Driver

Now described is how the driver constructs the queries for the scheme. The scheme fully operates over encrypted data given the breadth of SQL commands and does not require decryption. Therefore, the driver translates plaintext queries from the database applications into encrypted queries so they can work with the ADB. Now described is how the driver handles such query re-writing and management in general and then how it handles issues specific to specific kinds of SQL queries. As for the almost real-time performance feature of queries through the use of indexing, this is discussed in more detail in the Implementation Performance Results section. The driver loads the private key into memory for faster data encoding and decoding. The driver intercepts and parses each query going from the client application(s) to the server. The driver identifies all the columns where constants are specified (for example, in SET clauses of UPDATE statements, WHERE clauses in SELECT statements, etc). The driver encodes these constants for each group of the table(s) targeted by the query using the table's (or tables') private key; it constructs a large multi-part query. To illustrate, query construction for a single table A1 is demonstrated as an example. However it is readily apparent that the driver can readily work with multiple tables. For each A1 group, the driver creates a sub-query containing the column(s) which are implicated in the query and it properly encodes the relevant constant(s) for that group. All the sub-queries are appended together using OR statements into larger tuples.

Constructing Anonymous Queries

Based on our test results, it has been found that the server efficiently processes queries when each of these larger tuples manages a specific number of rows across all of its sub-queries. In our testing, an MS SQL 2008 Server worked efficiently when there were about 260,000 rows processed by each of these larger tuples. The 260,000-row capacity may be server specific. Therefore, it is a configurable parameter, i.e. a file, in the database private key. The driver computes how many sub-queries to place within a larger tuple so that the server efficiently handles anonymized queries. The driver knows the number of rows and the number of groups in A1; they are part of the database private key. Therefore, the driver uses the following formula to compute the optimum number of sub-queries to place into the larger tuples:

$$\text{round}([260000 * \text{number of groups in table}]/\text{number of rows in table})$$

Once the larger tuples are formed, they are combined with UNION statements to produce a large multi-part query. In certain cases, to more easily manage queries, one may preferably invoke a stored procedure on the server. In this example, it is passed as a list of the encoded constants. The stored procedure parses our list and dynamically creates and executes the necessary SQL statements. Note that when string columns are implicated by the application's query, the driver automatically supplies the correct padding to identify the correct strings. As discussed in Anonymization Step 3, every string value is padded by repeatedly appending it to itself, one character one at a time, wrapping back to the beginning of the value until the maximum length of the column is reached. After the padding, the driver is ready to encode the constant(s).

Anonymous LIKE Statement Processing

If the WHERE clause of a user's query contains a LIKE statement, the proper construction of the encoded LIKE statement depends upon the construction of the plaintext LIKE constant in the query. If the wildchar '%' is the final character of the plaintext LIKE constant, then the encoding of the constant in the encoded WHERE clause encodes the prefix before the wildchar for each group in A1. But if the plaintext LIKE constant contains wildchars prior to the final character of the constant, then the driver will have to create a multi-component query. Each component will encode a full query to find the rows where the encoded LIKE constant is located at a specific position in the string. The query components will be ORed together to produce the multi-component query that finds all the needed rows satisfying the user's request. In particular, each component query focuses on encoding a LIKE constant that locates the needed constant within different string positions using a moving index across the implicated string column. The first component query, starting at the index of 1, encodes the query so that the LIKE constant is found in the first position of the implicated string column. Continually moving the index to the right by one, each subsequent component query encodes the query so that LIKE constants are found at each successive character position in the implicated string column. Component queries are created until the maximum length of the implicated string column, available from the targeted table's private key, in memory, minus the length of the plaintext LIKE constant, has been reached. The "placeholder" SQL character "_" will be used to fill all the positions in the encoded LIKE constant before the index currently being examined. This will force the encoded constant to be found at that particular index position of the encoded string and nowhere else in the implicated string column.

Anonymous LIKE Statement Example

The following example illustrates the construction of a multi-component query for a non-trivial plaintext LIKE constant. Imagine the driver receives a SELECT statement which includes the WHERE clause " . . . WHERE last_name LIKE '% ack %'". Assume the column last_name has a padded length of 8 characters. The driver will produce a 6-component query. The first component will encode "ack" for all A1 groups for last_name character positions 1, 2, and 3. The encoded LIKE constant will have zero "_"s preceding it because the constant for this component query tries to find strings where it is present specifically in the beginning of the string, in position 1. For example, if "tr2" are the encodings of the characters "ack" for positions 1, 2, and 3, respectively, the LIKE clause for this component query would be " . . . LIKE 'tr2%'". The second component query encodes "ack" for all A1 groups for last_name character positions 2, 3, and 4. The encoded constant has one "_" preceding it because this encoded LIKE constant aims to find strings where it is specifically found in position 2 in the string of the implicated string column. For example, if "f5P" is the encoding for the characters "ack" for positions 2, 3, and 4, respectively, the anonymized LIKE clause for this component query would become " . . . LIKE '_f5P %'". And so on, until the encoding of the sixth query component. That component will encode "ack" for all A1 groups for last_name character positions 6, 7, and 8. The encoded constant has five "_"s preceding it because that anonymized LIKE constant tries to find strings where it is found starting at exactly position 6 of the string. For example, if "J9a" is the encoding for the characters "ack" for positions 6, 7, and 8, respectively, the anonymized LIKE clause for this component becomes " . . . LIKE '_J9a'". (There are five underscores between the apostrophes in the constant). These six components are ORed together to produce the large multi-part query. Note that the encoded LIKE constants, especially those in the last few component queries, may implicate rows where the constant is found in the encoded padding as opposed to the actual encoded string value. These rows will be discarded on the client. As part of the cleaning of the result set on the client, the driver checks whether the constant found in the string is within the permitted length of the string. The string length is obtained from the RecInfo column. If it's not within the length of the string the row is discarded.

Presenting Results to User

The large encoded query (or encoded list for the stored procedure) is sent to the server and encoded results, if any, are returned to the client. If any results are returned, the driver first discards any fake rows. It compares their GpNum values with its file in memory describing which groups are false and which are true. In the remaining rows, all the string values are trimmed based on their original lengths as encoded in their RecInfo columns. Next, the encoded strings and numerical values are decoded. As each numerical value is converted to its original value, first, its associated RowNum is compared to the outlier RowNums, also in the database private key in memory. If the RowNum matches the RowNum flagged as having one or more numerical outlier values, the original outlier value(s) is reinstated before the result set is returned to the user. Similarly, towards the end of any result set processing, every outlier value is examined to ensure that if no row was returned containing that outlier value, but the value should have been in the result set, an outlier row is created with its original strings and numeric values in the result set. A similar process is undertaken when an arithmetic query implicates an outlier value. Any arithmetic computation (e.g., SUM, AVG, etc.) result returned by the server is additionally (re)processed on the client to include any outlier value(s) involved in the computation. All the plaintext rows in the result set can finally be returned to the user. It's important to note that the result set comes back to the client as one set of rows which are processed and then returned to the user. The driver does not wait in a loop interacting with the server, obtaining partial result sets and building up the final result set. Our driver could be implemented for such interaction, but currently works with a single query and a single response. FIGS. 11A-C show how a small result set from a SELECT query targeting a simple table is decoded based on the database private key in memory. (Bold characters are used to illustrate the changes happening to implicated row values after each step).

Now described are the handling of specific queries:

Select

A SELECT statement is handled like the general query case described above. However, as will be further described when discussing the DELETE command, only rows which are not in the R1 table, which are rows being scheduled for deletion, can be involved in any query. When constructing the SELECT query, the driver therefore appends to it a clause to do an OUTER JOIN with the R1 table. From the table resulting from this OUTER JOIN, the query selects only those rows whose RowNums are not in R1. These rows are then returned to the client as the result set.

Count

A COUNT statement is implemented relatively directly. As in the SELECT statement discussed above, the result set must only include those rows which are not scheduled for deletion. Again, the clause to do an OUTER JOIN with R1 is appended to the encoded COUNT query to count only the non-R1 rows. Sub-counts of rows for each group, based on the associated SELECT statement with the COUNT clause, are returned along with the group numbers for each sub-count. The client discards the sub-counts of false groups, adds the remaining sub-counts, and presents the final COUNT result to the user.

Update

An UPDATE statement is handled partly like the general query case. Because the rows implicated by an UPDATE command may cross groups, we use a different "SET <variables>" clause for each group to UPDATE the variables in that group using its proper encoding. Consequently, each group gets its own UPDATE command. For each UPDATE, command, the client encodes the constant(s) the user is searching for (e.g., specified in his WHERE clause), and the constant(s) we want to set the column(s') values to. To preserve the padded length of the constants to be inserted, before they are encoded, they are padded with the original string value repeatedly. As explained before, this is done character by character until we've reached the maximum length of the column. Further, because the new constants may have a different length than the string values they replace, we update the RecInfo column for all the affected rows with the new lengths. The driver encrypts the new length of each constant by permuting it into a character in the ODB domain, using the sub-key in the overall encoding file, available in memory, for the associated string length "column" and group. The client sends to the server a list of UPDATE commands separated by blanks. The server treats each UPDATE command independently. Each UPDATE command updates the implicated rows in a specific group with the new constant(s) and sets the proper RecInfo locations of those rows to the constants' new lengths.

An important point to make is that whenever UPDATEs are issued, if rows with outlier values are implicated, this should become known to all client machines. Otherwise, they will continue to rebuild result sets with outdated outlier values. The client issuing the UPDATE to the outlier(s) will update his database private key in memory with the new outlier value(s). Its driver will then copy the outlier file (the H1 file, as per Anonymization Step 12) into the shared network drive for all the other clients to access. Thus, before it issues any query, the driver on any client checks the shared network drive to see if the date or time of the outlier file are different compared to the file it has in memory. If date or time is different, the driver uploads the new file into memory before making a query to the ADB.

Insert

An INSERT statement is handled by working with the last group in A1. For each new row to be INSERTed, all the string values of the row are padded by repeating their values until the maximum lengths of their columns are reached. The padded values are then encoded using the sub-key, within the overall encoding file, for A1's last group. The numeric values of the row will be converted using the random "average" value, random multiplier, and random addend for the last group. The true lengths of each string value are mapped into random characters in V1 using the sub-key for each string length "column" for that group. The lengths are also recorded in the RecInfo column. The next sequential RowNum for the row is also created for the row. (In our case, this is done automatically by the server because the RecInfo column is designated as an IDENTITY column in A1 in our test database. When a new row is INSERTed, the server automatically assigns the next numeric value to the RowNum value of that row). Because during UPDATE and SELECT commands we UPDATE and SELECT from A1's last group, the new row is now retrievable from A1 if it's implicated by a query.

Delete

DELETE commands are handled in a special manner. Because we found, during our testing, that straightforward DELETE commands to the ADB were taking 3-4 times longer than one reference standard we compared our performance to—the Microsoft JDBC driver, as we will discuss in our Performance section below—, we came up with a different solution for row DELETEs. We created the R1 table. (Please see Anonymization step 2 for a description of R1). The DELETE command is constructed similar to a generic query. But rather than deleting rows, it constructs INSERT commands for each group, INSERTing the RowNums of the rows to be DELETEd into R1. A scheduler is set up on the server to invoke a stored procedure to actually DELETE the rows in R1. We found when testing, that when the stored procedure tried to delete a large number of rows, other client queries were forced to wait until the command completed (apparently due to table or row lock-outs). We had to break our scheduled DELETE tasks into smaller chunks. Rather than scheduling a DELETE for all rows in R1, our stored procedure was configured to only DELETE 100 rows at a time. The stored procedure was scheduled to run every minute of every day. With such a configuration, actual row erasures had negligible impact on the client's other queries. (See the Performance section for additional information on DELETE command performance). Of course with our scheme, a given customer can schedule more deletions per run, or, conversely, less frequent runs, knowing the performance capabilities of its hardware and software.

Note that whenever DELETEs are issued, if rows with outlier values are implicated, this should become known to all client machines. Otherwise, just like for the UPDATE command, clients will continue to build result sets with outdated outlier values. The client issuing the DELETEs to the outlier (s) will remove the value(s) from his database private key. Then he will copy this file (i.e. the H1 file) into the shared network drive with the other database private key files for all other client machines to access. Before any query, each client driver checks to see if the outlier file on the shared network drive is more recent compared to the file it has in memory. If so, the driver uploads the new outlier file before making new queries to the ADB.

Join

Various JOINs can be started on the server and completed on the client. This uses the Xi tables created in Anonymization Step 16. When JOINing Ai to Aj, Ai is first JOINed with the Xi table and then the Xi table is JOINed with Aj. The results of both JOINs, modified to extract only those set of columns requested by the user, are sent to the client. The client will then restore the proper JOIN result set and present it to the application. For illustration, we focus on retrieving the rows of A1 when it's INNER JOINed with A2 over a single column. But other kinds of JOINs (e.g. LEFT, SELF, etc), including multi-column and multi-table JOINs can be similarly done using such a scheme. Suppose the column name is l_name and we want to merge the tables intake and discharge. The JOIN we discuss is: "SELECT a.* FROM intake AS a JOIN discharge AS b ON a.l_name=b.l_name". We first describe the mechanics how our driver implements the JOIN and then show an example to clarify the points. We obviously cannot do a JOIN of the two implicated tables directly on the server due to different group encodings in the ADB. Imagine l_name "Jones" is in group 5 of A1 and in group 7 of A2 but does not exist in group 5 of A2. A JOIN involving equality comparisons between A1 and A2 would fail to produce results for "Jones" because, due to different encodings, its versions in A1 group 5 and A2 group 7 could not be directly equated. Currently our driver implements JOINs via a stored procedure on the server but this can also be ported to the JAVA (programming language) code in our driver. Upon getting a JOIN request from the application, the driver sends the tables and column implicated to the stored procedure. The stored procedure combines the results of two special types of queries in one table, J1, which it returns to the client. The driver will restore the correct JOIN result set for the user on the client via J1. The first component of J1 is the selection of rows from A1 when it is JOINed (i.e., based on equality or other comparison as specified in the user's query) to the encoded X1. Because X1 encodes all values of A2 encoded as for every group in A1, all possible A1 rows that can link to A2 rows on that column are selected, regardless of encoding. The second component of J1 will select the rows from X1 which are JOINed to the rows of A2 (again based on the comparison as specified by the user's query), GROUPed BY the frequency with which they occur in X1. Because X1 encodes all values of A2, we are basically merging A2 with itself. The intent is, for each group, to identify for each A2 token how many times it is implicated in the JOIN. This frequency is used to reproduce the correct number of times the rows from the first part of J1 are found in the result set, as will be shown below. Both J1 components are returned the client in one combined result set.

Figure 12A:
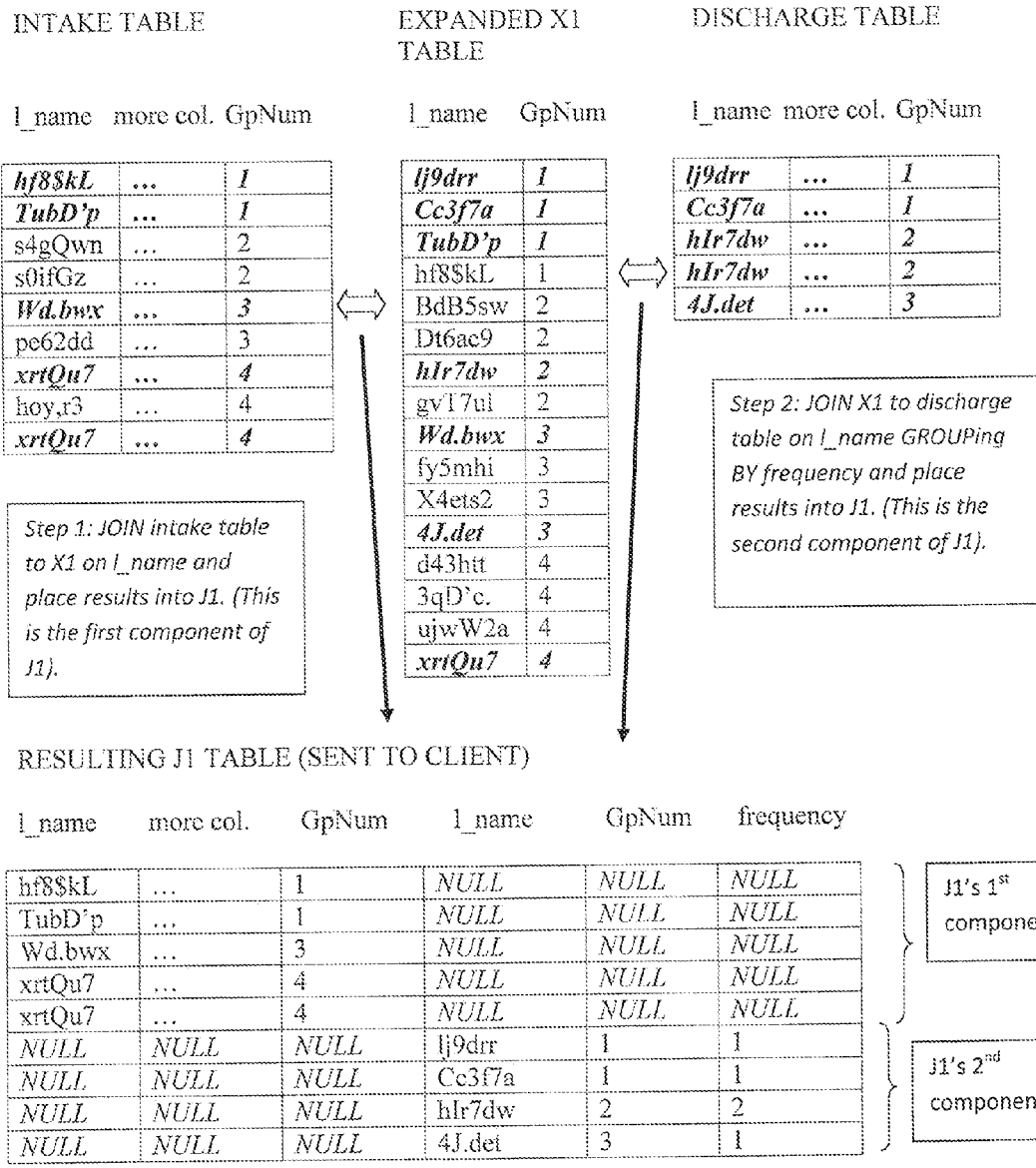

The driver handles the returned J1 via a loop. First, all the rows in both components of J1 are stripped of false rows. Next, the column implicated in the JOIN is fully decoded in both the first and second components of J1 so we can compare strings without the interfering group encodings. Next, for each row of the second part of J1 (i.e., the A2-implicated rows of the JOIN), every row in the first part in J1 (i.e., the A1-implicated rows) is checked. When there is a match of rows based on the requested comparison, each row in J1's first part is reproduced in the result set as many times as the frequency count for the row from the second part specifies. The effect of this step is to reproduce every row in A1 exactly as many times necessary as if we did the INNER JOIN directly on the server for the implicated column. And when done for all rows from both components in J1, the result is the one requested by the user: we pick just the rows of A1 when it forms a cross-product with A2 on the implicated column. FIGS. 12A and 12B illustrate the INNER JOIN process over tables intake, discharge, and X1. (In the example shown in FIGS. 12A and 12B, we do not show how the values in the l_name column were originally encoded but that once decoded they can be readily JOINed. Also, the padded string length for l_name is 6 alphanumeric characters. Further, only the true rows are shown in the intake and discharge tables for a simpler presentation. Finally, for easier visualization, the bold italicized rows shown in the intake, discharge, and X1 tables are the ones implicated in the JOIN with X1 in either J1's first or second component). The result table obtained can now be fully decoded and returned to the application.

Mathematical Functions

With regard to mathematical calculations, some calculations can be performed on the server with intermediate results transferred to the client for additional computations and final presentation to the user. For other mathematical computations, complete rows, or at least the numeric values of the implicated columns, must be returned to the client and the full calculation be performed on the client. In all cases, the R1 table is used to avoid computing with rows that are scheduled for deletion. The sections below explain how different computations are managed.

Comparison Functions

Comparisons such as '>', '<=', etc. involving numbers can be done on the server. Because the encoded numbers are ordered within each group, we can select from each group exactly which rows satisfy the comparison. By specifying a different comparison constant for each group, the same procedure to create the multi-part query as for the general query case is done here, with each query component seeking the rows which satisfy the comparison in its group. The single large query therefore obtains all the rows satisfying the comparison function in the table.

Aggregate Functions

MIN and MAX functions can be partially performed on the server and completed on the client. Just like the Comparison Functions above, due to the monotonicity of the mathematical function, the server can find the MIN or MAX value(s) within each group, returning them to the client. The driver can decode the sub-group MIN/MAX values and return the overall MIN or MAX across all the groups to the user.

The SUM computation can be started on the server and completed on the client. As an illustration, consider doing a SUM for just one group, to understand the general case. Imagine that the user wants to compute a SUM of a column, and a total of 3 rows from the same group are implicated. The original implicated numeric values are A, B, C; the user needs A+B+C. We add the encoded values for A, B, and C on the server and remove the average and random multiplier factors on the client. Suppose A, B, and C are in group 12 and are encoded as follows:

$$((A-\Delta12)*RM12)+RA12$$

$$((B-\Delta12)*RM12)+RA12$$

$$((C-\Delta12)*RM12)+RA12$$

Here $\Delta12$ is the average of the implicated column for group 12 while RM12 and RA12 are, respectively, the random multipliers and random addends for the implicated column for group 12. If we add these encodings on the server, we get:

$$((A-\Delta12)*RM12)+RA12+((B-\Delta12)*RM12)+RA12+((C-\Delta12)*RM12)+RA12=$$

$$[(A-\Delta12)+(B-\Delta12)+(C-\Delta12)]*RM12+3*RA12=$$

$$[(A+B+C)-3*\Delta12]*RM12+3*RA12$$

We return this value to the client. We also need to return the number of rows implicated to the client, in this case 3. The driver subtracts from the returned result <number of rows implicated>*[random addend for group] (i.e. 3*RA12, in this example). The random addend it has in its database private key in memory. This result is divided by RM12, which it also has in memory. To this result the driver adds <number of rows implicated>*[avg of column for group] (i.e. 3*$\Delta12$, in this example. Note, the driver has $\Delta12$ for the implicated column in memory as well). The end result is the required SUM. For a more general multi-group SUM, the group-specific SUMs along with their row counts are returned to the client just as in the example above, decoded, and added together to provide the requested multi-group SUM to the application.

The computation for AVG can be done similarly to SUM. We compute the SUM for each group as above, combine each of the partial results on the client to produce a total sum, and divide this value by the total number of rows selected, which should be returned for each group. This is the desired average.

Other Functions

Although other mathematical functions can be partially performed on the server they mostly have to be done on the client. For trigonometric functions (SIN, COSINE, etc), the rows implicated need to be returned so that the trigonometric functions can be computed on the client. Logarithmic functions have to be computed on the client as well. Exponential functions can be partially computed on the server, but administratively it's easier to do the full computation on the client. Since the random addend for the group, now exponentiated, was added to the original numeric value, it will have to be removed by dividing the exponentiated value from the server by the exponentiated random addend. The random multiplier, a multiplier, would have to be removed on the client by dividing this result by the exponentiated random multiplier. Because the average for the group, now exponentiated, was subtracted from the original numeric value, it will also have to be removed by multiplying the previous result (which removed the exponentiated random multiplier) by the exponentiated average. Given these complex corrections, it's easier to perform the entire calculation on the client. Various other functions (e.g., STDEV (Standard Deviation), POWER, etc.) must be computed on the client as well.

Ordering Functions

GROUP BY and ORDER BY Statements

The GROUP BY and ORDER BY functions can be initially done on the server but mostly will be handled on the client. The GROUP BY function can aggregate data within a group. If only a single group's rows are implicated, the client can simply decode and return the GROUP BY results collected by the server to the user. If the aggregation of variables is done across groups, the server must return the results GROUPed BY within individual groups because of different encodings across groups. The client will decode the data, synthesize values across groups, and present the aggregate results to the user. A similar approach is used for the ORDER BY function. If numeric values must be ORDERed BY and they are just contained within one group, sorting them can be readily done on the server just as described in the Comparison Functions section above. If numeric values must be ORDERed BY and multiple groups are implicated, then all the affected rows will have to be returned to the client, decoded, and ordered in DESCENDING, etc. order and presented to the user. Numeric order is not preserved across groups. Finally, all affected rows will also have to be returned to the client when doing ORDER BY involving string comparisons. Because lexical order is not preserved after original plaintext characters are randomly permuted into other characters, all the implicated rows will have to be returned to the client. The driver will decode the rows, alphabetize the strings as requested, and present the ordered rows to the user.

Performing Secure String Comparisons

However, outside of the ORDER BY clause, doing direct string comparisons—e.g., when explicitly requested by the user in his WHERE clause—, is possible on the server. The driver constructs SQL requests to extract the necessary strings plus false SQL requests to extract strings which are purposefully NOT "greater than", NOT "less than", etc. compared to the user's comparison string. The former SQL requests provide the needed result set rows while the latter SQL requests undermine the intruder's re-identification efforts. Although lexical order is not preserved on strings, the driver does know which strings are ">", "<", etc. compared to the user's comparison constant(s). Our anonymized query is constructed to specifically ask for those strings. Due to the sheer volume, the driver doesn't itemize all possible strings meeting the user's criteria. Instead, the driver only specifies the individual characters in the first character position of the string that satisfies the user's request. The driver constructs a LIKE statement containing all the needed first position characters which, collectively, locates a superset of all strings that are in the user's requested range. From this result set the driver selects the specific rows needed by the user. For example, if the user asks for all rows " . . . WHERE last_name>'williams'", the first letter in the comparison string is "w". The range is the lower case letters; therefore, on the server we must find those rows where last_name starts with individual letters from "w" though "z". Each of these letters in the range enters a LIKE clause so that the correct rows can be located in the targeted anonymized table. The driver also adds to the LIKE clause several false characters, opposite of what the user asked for, to retrieve fake, unnecessary rows as well. Given the WHERE clause just mentioned, the driver will ask for last_names that begin with, say, "d", "e" and "k" to be returned, too.

From a security perspective, the intruder, who sees how many parts comprise our LIKE statement, will not be able to tell which string the user originally asked for. First, we are asking for character positions, not strings, so the most the intruder can surmise is that we are looking for ">='w'" rather than ">'williams'". Second, the mere fact that we send a particular number of characters in our encoded LIKE statement does not tell the intruder if the encoded query represents a simple comparison such as ">='w'" or a more complex one such as ">='c' AND <='f'". In both cases, in the domain of lower-case characters, both requests will produce an equivalent 4-component query (not including the fake character requests). Hence, the intruder cannot say what the user really asked for from the database. Third, the intruder also cannot guess which characters we are looking for because of the addition of false characters. The total number of characters in our LIKE statement will probably be larger than the total number of characters arising just from the range of first characters that we are specifying in the LIKE clause. The intruder can count the characters in the LIKE clause and find the letter that is this many positions from the end of the range or the letter that is this many positions from the beginning of the range. But he will be unable to discern the first letter in the user's original comparison constant because he cannot compute the right offset to be used due the inclusion of the fake characters in the LIKE clause. Finally, the intruder will also not be able to surmise which characters we seek because he will be unable to tell the range we are working with, further weakening re-identification efforts. Lower case and upper case characters are both encoded through random permutations in V1. Simply looking at an encoding does not reveal the case of the original plaintext character. Seeing an "h" as an encoding of a plaintext character does not reveal to the intruder whether the encoded query represents ">='s'" or ">='S'".

String Comparison Example

The following example is an illustration of how a string comparison query is constructed.

Consider the request "SELECT * from patient WHERE last_name >'smith'". We focus on the first character of the constant "smith", the letter "s". For each group in "patient" (i.e., now it's in the form of the anonymized table A1), we construct a LIKE statement to find strings beginning with "s". The driver appends one character at a time to the clause until it reaches the end of the range of the domain. The range in this case is "s" through "z". To understand the construction of the entire query, let's just focus on encoding one group, say group 23. In group 23, these 8 characters are encoded as, respectively, a, 6, d, w, U, p, Q, s. They enter our anonymized LIKE statement. We also find 0-10 "fake" characters preceding "s", say, a total 4 characters. Imagine these characters are q, e, g, b, and they are encoded as, respectively, y, 3, 9, L in group 23. These characters are also added to our LIKE clause. The encoded subquery for group 23 in A1 becomes: "SELECT * from patient WHERE last_name LIKE '[a6dwUpQsy39L]%'. A similar encoded subquery will have to be constructed for all the other groups in A1. All the subqueries are combined into one large query as in the general query case described above and sent to the server. Upon return, in addition to deleting all the false rows, all the unasked-for rows are deleted by the client, too. In the case of group 23, these would relate to the encoded characters y, 3, 9, L. The client would have to delete the unasked-for rows from the other groups using their encodings as well. Lastly, the last_name values in all the remaining rows are decoded. They are compared to the original comparison string "smith" to find just the last_name values which are ">'smith'". These rows are then fully decoded and returned to the user.

Performance of String Comparison

Because we return more rows to the client than necessary, this method appears a bit slower than if we could issue string comparisons more directly. However, the majority of these rows will have to be returned anyway because they are implicated in the user's query. Any slower performance of this approach therefore mostly arises due the additional rows being retrieved from the fake character requests in the LIKE clause. However, as our Implementation Performance Results section below shows, the overall performance of our scheme on various commands (e.g. SELECT, UPDATE, DELETE, etc.) is good and that includes the use of LIKE constants in WHERE clauses. Therefore, delays to retrieve the fake rows for this approach should be manageable as well.

Programming Constructs

In addition to general queries, programming constructs such as STORED PROCEDUREs, VIEWs, and similar functions on the server called by clients' database application(s) can be "anonymized" on the server as well so that they can also work with the anonymized data. Whether the database script of the construct has to be changed on the server, however, depends on its complexity. A simple construct performing very basic queries may require no changes and our driver can call it directly. A simple construct expecting arguments also may require no changes. For example, if the construct takes arguments and targets a single table, our driver can simply create a long query containing as many subqueries as there are groups in the resulting anonymized table. Each subquery will call the construct once using encrypted constant(s) for a particular group in the anonymized table. These subqueries can be linked together via UNION statements so that the client ultimately receives the full set of result rows. Certainly complex constructs may require changes to the database script so that various queries can properly deal with the anonymized data.

In embodiments of the present invention, the anonymization process is a relatively infrequently-run process, perhaps happening quarterly or semi-annually. It must be done once to create the ADB. If no new rows are subsequently INSERTed, the owner of the ODB may wish to re-anonymize the ODB several times a year, much as if changing an application or network password. Although statistics are secure and are not changing, good security practice dictates that periodically changing the secret preserves its secrecy. Malicious observers are noticing information about queries and encodings in the ADB, which improves their attempts at re-identification of these essentially static data over time. If rows are INSERTed regularly, the ODB owner may want to re-anonymize the data perhaps once per month or more frequently to create more secure statistics. The ODB must be available for the re-anonymization; alternatively, the ADB can be decrypted and the resulting plaintext database re-anonymized. After every re-anonymization, the new database private key must be placed on the shared network drive. Other clients will access this database private key so that they can properly work with the newly-anonymized tables.

In the foregoing exemplary embodiments, we have described various computations over strings as requiring the decryption of results on the client machine before further analysis and aggregation can be completed on the client so that final results can be presented to the user. In fact, should it ever become necessary to analyze encrypted string data on the client, this can also readily be done due to the structure of our table private key for any Ai. Our key (the encoding file) is built on the database in Anonymization Step 13 wherein every character position in V1 is permuted into some other position in V1. This permutation is stored in a consistent, ordered fashion in the Ai table private key. For example, for every permutation of lower case characters, we store in our table private key, in alphabetical order, first how the letter "a" is permuted, then how the letter "b" is permuted, and so on, until how the letter "z" is permuted. Furthermore, because each representation of the next character position in a column in a given group is merely appended to the bottom of the table private key as the key is being constructed, and the size of V1 obviously does not change during each position permutation, the driver knows at any given time the offset in the Ai table private key where the permutation for a given character position for a given column for a given group begins. This unique structure of the Ai table private key allows the driver to quickly examine the encoded characters of strings returned in result sets and determine their equality or lexical order despite the fact that their character permutations are completely random and regardless of whether the strings are actually in the same or different groups. Therefore, GROUP BY, ORDER BY, and JOIN—rather than decrypting data on the client to complete analysis and aggregation, as they are described to at least partly do in the foregoing embodiments—these statements can readily be coded within the driver to examine encrypted data on the client. They could be readily re-programmed to work as follows: first, they properly construct the result set to be presented to the user from the result set sent by the server while it's still in encrypted form. Then they decrypt the restructured result set and then they immediately present the decrypted result set to the user. There is no need for these commands to do further work on the result set after it's decrypted because all cleanup (post processing) is done on the encrypted result set sent from the server. Our testing in our "Implementation Performance Results" section below was not done when such commands were coded to work with encrypted data but rather when they are coded to decrypt results as soon as possible on the client.

Also, we can readily encrypt our queries and result sets by encrypting the channel between clients (or some intermediary gateway) and the database server. A scheme such as SSL, IPSEC, etc. can be implemented to protect against known-plaintext attacks and similar kinds of attacks in the literature, if needed.

Now described are various working examples of embodiments of the present invention:

EXAMPLE 1

Anonymization Process

First, the anonymization technique takes some time to convert the ODB to the ABD. Converting a single table, O1, consisting of a hundred or a thousand rows into an anonymized table A1 made up of, respectively, approximately 300 or 3000 rows (i.e., two thirds of the rows are added false rows) and comprised of 30 groups (10 true groups and 20 false groups) takes about several minutes. If we start with an O1 containing 1,000,000 rows and wish to create a 30-group anonymized A1 table, A1 will have close to 3,000,000 rows and the anonymization can take about 5.5 hours to complete. If we wish to convert a 1,000,000-row O1 into a 120-group A1 table (still having about 3,000,000 rows but being a more secure table), the process takes about 7 hours to complete. Much of the time is spent by the database server running the database scripts. Much of this work can be ported to a JAVA (programming language) program to considerably improve performance. Moving the character encoding process, for example, from a database script to a JAVA (programming language) program changed the time required for this step from 3+ hours to 10 minutes.

EXAMPLE 2

Query Performance

The performance of various important queries in our scheme was good. We first examined in more depth our driver's performance compared to one standard, the Microsoft JDBC driver (MS driver from now on). We then compared the performance of our driver operating on two analogous A1 tables, with one being more secure than the other because it was divided into more groups. With the exception of a couple of references in this paragraph to the MS driver and the R1O table—both related to our comparison with the MS driver—the text herein describes our testing environment for both the MS driver comparison and the more-secure table comparison. Our testing was done on the MS SQL 2008 Server. The performance times pertaining to our driver below include the discarding of any false rows and the decoding, and string value trimming, of the result set by the driver to only present the proper plaintext values to the user. Note, as part of the creation of the ADB for our testing purposes, we did not employ the random addend for each numeric column as per Anonymization Step 11. We only used the average and random multiplier to encode a numeric column as described in that Step, and our statistics below reflect the usage of this pair only. However, because the random addend is only added to a number to encode it, it's incorporation to produce anonymous queries, as will be described below, and decode the result sets coming back should have minimal if any impact on the statistics below. The CPU of any computer should almost instantly handle the appropriate computations to incorporate the addend. For the purposes of our comparison with the MS driver, we compared retrieval times of the MS driver on an O1 table with 1,000,000 rows to that of our driver on the resulting A1 table of about 3,000,000 rows divided into 120 groups. Although we have recommended using a total of 30 groups for anonymization purposes earlier we wanted to examine the performance of an even more secure table to gauge any performance impact. Because in a real production environment at any given time a small portion of rows from the ODB is always deleted, we wanted to engage our DELETE mechanism so we could mirror and thus test our scheme's performance in an "equivalent" environment. Our DELETE mechanism is implemented by storing the RowNums to be DELETEd in R1. A number of our queries are implemented to also check the R1 table before retrieving or computing over the implicated rows to avoid processing any DELETEd rows. For most of the queries below, we purposefully DELETEd about 50,000 rows from the O1 table and an equivalent amount from the A1 table. (That is, for the A1 table we INSERTed the RowNums of the rows to be DELETEd into R1). For the purposes of our comparison with the MS driver, we used an equivalent R1, called R1O from now on, for the O1 tables to hold the row numbers to be DELETEd for these tables. We similarly checked against R1O when performing various queries against the O1 tables to avoid processing any DELETEd rows.

Our driver's performance results compared to the MS driver are summarized in Tables 4 and 5 below, the latter illustrating our performance comparison results for the JOIN command. The illustrations are followed by a discussion.

TABLE 4

| | Our Driver | | | | |
|---|---|---|---|---|---|
| Table: about 3,000,000 rows | | Num of Groups: about 120 | | Microsoft Driver Table: 1,000,000 rows | |
| Command | Anonymized Result Set (total true and false rows returned) | True Result Set (total true rows extracted) | Speed | True Result Set | Speed |
| SELECT (large request) | ~51,500 | ~47,500 | ~1 min., 50 sec. | ~47,500 | 3+ min. |
| SELECT (small request) | ~780 | 2 | 2-3 sec. | 2 | 2-3 sec. |
| numeric ">" comparison (larger request) | ~1,840 | ~930 | ~5 sec. | ~930 | ~5 sec. |
| numeric ">" comparison (small request) | ~5 | 3 | 2-3 sec. | ~3 | 2-3 sec. |
| DELETE (large request) | ~101,800 | ~95,400 | ~8 sec. | ~95,400 | ~7 sec. |
| DELETE (small request) | ~780 | 2 | 2-3 sec. | 2 | 2-3 sec. |
| COUNT (large request) | ~107,200 | ~94,800 | 4-5 sec. | ~94,800 | ~4 sec. |
| COUNT (small request) | ~780 | 2 | 2-3 sec. | 2 | ~2 sec. |
| UPDATE (large request) | ~107,200 | ~95,000 | ~39 sec. | ~95,000 | ~15 sec. |
| UPDATE (small request) | ~1,530 | 2 | ~5 sec. | 2 | ~2 sec. |

For the JOIN discussion below—part of our comparison with the MS driver—, our O1 was only 100,000 rows not 1,000,000 rows as above for the main MS driver comparison testing. For the JOIN comparison we only DELETEd about 5,000 rows from the O1 table and an equivalent amount from the A1 table. As we will see in the JOIN discussion below we tested JOINing O1 to O2 with JOINing A1 to A2. O2 had a size of 20 rows while A2 had a size of about 60 rows. Our performance results for the JOIN command are summarized in Table 5:

TABLE 5

| | Our Driver | | | Microsoft Driver | |
|---|---|---|---|---|---|
| Table A1: about 300,000 rows | | | | Table O1: 100,000 rows | |
| Table A2: about 60 rows | Num. of Groups: about 120 | | | | |
| Anonymized Result | Num. of Groups: about 30 | | | Table O2: 20 rows | |
| Command | Set (true + false rows and row frequency counts returned) | True Result Set (total true rows extracted) | Speed | True Result Set | Speed |
| JOIN | ~52,600 | ~76,000 | <2.5 min. | ~76,000 | almost 5 min. |

We now elaborate on results shown in Tables 4 and 5s.

SELECT Statement

With regard to completing SELECT commands, our driver was equally fast compared to the MS driver when result sets were small. It was considerably faster than the MS driver when result sets were large. When retrieving a small result set from O1 (2 individual rows via a SELECT statement), the MS driver took 2-3 seconds. Retrieving an identical small result set (which contained 2 true rows and about 780 true and false rows in total) from A1 using our driver also took 2-3 seconds. When retrieving a large result set with tens of thousands of rows or more, the MS driver took about a third or more time compared to our driver. Retrieving a result set with about 47,500 rows took the MS driver a little over three minutes to finish. An equivalent result set containing 51,500 true and false rows (and the same about 47,500 true rows) took our driver about a minute and fifty seconds to complete. We suppose that the printing of the results to the screen—in which the MS driver preserves the full length of each column and therefore winds up printing many blanks before the field separator, while we only print the true length of each field followed by its separator—, may be one reason why our driver performed faster than the MS driver. It may also be the way the MS driver extracts rows from the database (e.g. apparently using a cursor to fetch rows in a specific way from the database before returning for additional rows). The MS driver source code was not available to us so we could not confirm the reason for its slower performance.

JOIN Statement

Our driver executed the JOIN command considerably faster than the MS driver as well. This was not only due to the possible printing and database query management issues discussed above. We also send less information to the client from the server and therefore optimize communication performance. Because we GROUP frequencies of, for example, the A2 table rows rather than sending back each row which is implicated, we reduce the overhead of the communications. For example, imagine we are JOINing A1 to A2 on field last_name and want to only select A1's rows. Table A2 has 10 rows with the same last name in group 32 which will be implicated in the JOIN. For group 32, we send back one row with that last_name value along with a frequency count of 10; we don't return the other 9 rows, as discussed under JOIN command processing earlier. Because this is done across many tokens in A2, we potentially considerably reduce the amount of data we return (of course, this depends on the size of the JOIN result set). To assess JOIN performance, we tried JOINing an O1 table with 100,000 rows with an O2 table of 20 rows on a single column and just SELECTing the rows from O1. The MS driver took almost 5 minutes to complete, and a total of about 76,000 rows were involved. We tried JOINing the associated A1 table of about 300,000 rows broken into 120 groups with the associated A2 table of about 60 rows, again SELECTing just the A1 rows. Our driver took a little under 2.5 minutes to finish. (A total of about 52,600 true and false rows, including the frequencies with which certain rows must be reproduced were involved).

Comparison Statement (">")

The performance of the ">" comparison was the same between our driver and the MS driver. A retrieval of a small result set—3 rows—using the ">" comparison on a numeric column took both the MS driver and our driver about 2-3 seconds to finish. (Our driver retrieved the same 3 rows and about 5 true and false records in total). A retrieval of a larger result set—about 930 records—using the ">" comparison took both the MS driver and our driver about 5 seconds to complete. (Our driver extracted the same approximately 930 records from within a result set of approximately 1,840 true and false records).

DELETE Statement

Our DELETE performance was quite close compared to the MS driver. Because we DELETE by INSERTing RowNums into R1, to make a meaningful comparison, we compared our ability to INSERT rows into R1 with the MS driver's ability to INSERT rows into the R1O table. Our DELETE statistics measure the time to INSERT the implicated rows into R1, or R1O, as opposed to actually erasing those records from their respective tables. A DELETE for a small number of rows, 2 rows, took 2-3 seconds using the MS driver as well as our driver. (Two rows and about 780 true and false rows in total were DELETEd by our driver). A DELETE command to erase about 95,400 rows from O1 took the MS driver about 7 seconds to finish. Our equivalent DELETE command on the A1 table (about 95,400 true rows and about 101,800 true and false rows in total were involved) took about 8 seconds to finish.

COUNT Statement

When issuing COUNT commands, our driver's performance was also quite close to the MS driver. When the number of rows implicated was few (2 rows), the MS driver retrieved a COUNT result in 2 seconds. Our performance on small result sets (e.g., the some 2 rows and a total of about 780 true and false rows were involved) was 2-3 seconds. When the number of rows implicated was large, about 94,800, the MS driver retrieved a COUNT result in 4 seconds, whereas we finished an equivalent retrieval in 4-5 seconds. Our driver worked with a total of about 107,200 true and false rows to retrieve the approximately 94,800 true rows.

UPDATE Statement

The performance of our driver on the UPDATE command was about two and a half times slower compared to the MS driver. An UPDATE command to alter a single column value implicating a small number of rows (2 rows) took about 2 seconds via the MS driver while it took about 5 seconds via our driver. (Our driver processed about 1,530 true and false rows to UPDATE the 2 true rows). When working with large result sets, an UPDATE command to alter a single column value implicating approximately 95,000 rows took, on average, 15 seconds with the MS driver. With our driver it took, on average, about 39 seconds to finish. Our driver processed about 107,200 true and false rows to UPDATE the approximately 95,000 true rows.

In general, when we are slower than the MS driver, we suspect that our poorer performance is due to our need to involve more rows and more columns in our queries. Our queries implicate more sometimes many more (false) rows which the MS driver does not have to deal with. In the case of the UPDATE command, we also have to update the length field in the RecInfo column in addition to updating the implicated column value. The extra update takes approximately half of the time compared to the overall UPDATE elapsed time.

EXAMPLE 3

Query Performance Over More Secure Tables

With regard to query performance when the security of tables is increased, in our testing, increasing the number of groups into which an anonymized table is divided did not affect by much the time for queries to complete. We tested an O1 containing 1,000,000 rows and the resulting A1 containing about 3,000,000 rows divided into 30 groups (10 groups were true and 20 groups were false) as we normally recommend. We then improved security further by dividing an A1 generated from a very similar O1 (and also having roughly 3,000,000 rows) into 120 groups (40 groups were true and 80 groups were false). We tested the performance of SELECT, COUNT, DELETE, UPDATE, and mathematical comparison functions of the two A1's. Our testing process was described in the section above, "Query Performance". The 120-group A1 was, on average, slower by a couple of seconds, if that much, on various queries compared to the 30-group A1. FIG. 20 below highlights the performance comparison between the two A1's:

TABLE 6

| | A1 Table (30 groups) Size: about 3,000,000 rows | | | A1 Table (120 groups) Size: about 3,000,000 rows | | |
|---|---|---|---|---|---|---|
| Command | Anonymized Result Set (total true and false rows returned) | True Result Set (total true rows extracted) | Speed | Anonymized Result Set (total true and false rows returned) | Total Result Set (total true rows extracted) | Speed |
| SELECT (large result set) | ~54,100 | ~47,500 | ~1 min., 44 sec. | ↔ ~51,500 | ~47,500 | ~1 min., 50 sec. |
| SELECT (small result set) | ~5,500 | 1 | 1-2 sec. | ↔ ~780 | 2 | 2-3 sec. |
| numeric ">" comparison (larger result set) | ~2,100 | ~930 | ~4 sec. | ↔ ~1,840 | ~930 | ~5 sec. |
| numeric ">" comparison (small result set) | ~5 | 3 | ~2 sec. | ↔ ~5 | 3 | 2-3 sec. |
| DELETE (large result set) | ~114,800 | ~94,800 | ~8 sec. | ↔ ~101,800 | ~95,400 | ~8 sec. |
| DELETE (small result set) | ~5,470 | 1 | ~2 sec. | ↔ ~780 | 2 | 2-3 sec. |
| COUNT (large result set) | ~115,300 | ~95,500 | 3-4 sec. | ↔ ~107,200 | ~94,800 | 4-5 sec. |
| COUNT (small result set) | ~5,470 | 1 | 1-2 sec. | ↔ ~780 | 2 | 2-3 sec. |
| UPDATE (large result set) | ~114,800 | ~94,800 | ~30 sec. | ↔ ~107,200 | ~95,000 | ~39 sec. |
| UPDATE (small result set) | ~5,470 | 1 | 2-3 sec. | ↔ ~1,530 | 2 | ~5 sec. |

EXAMPLE 4

Database Private Key Issues

One potential drawback of our scheme is the loading of the database private key into memory. When we tested with an A1 of 3,000,000 rows and 120 groups, the loading of the various components of the private key could take 7 seconds. However, this delay only happens during the establishment of the session between the application and the database. The establishment of the session happens infrequently; therefore, the 7-second delay should also be infrequently experienced by the user. Our code to load the private key is placed in the initialization routines of the driver because we need the private key early in our processing. These routines are invoked when the session between the application and the database is created. (For example, this may happen when the user opens his application by double clicking on it in his Windows Desktop). The application will not close the session until the application is closed. Otherwise it has to pay the penalty of going through its own initialization routines again to open a new session with the database. Until the session is closed, therefore, the user will not experience the 7-second delay from the loading of the database private key into memory. The delay may be considered part of application initialization and we believe it should not significantly affect the user's experience. There will probably be other initialization delays which the user will have to bear as his application loads, and our 7-second delay may, in fact, be considered one such delay. However, if this becomes problematic, a separate daemon can be built which will start when the user boots his machine, or the first time that the user starts the application. The daemon will load and manage the database private key, communicate with our driver when it requests the key (e.g. for data encoding and decoding), and not close until a truly terminal event, e.g., a machine shut down. Under such a scenario, the 7-second delay is suffered by the user infrequently or, probably, rarely because the daemon should, practically speaking, rarely be closed.

A related issue when loading the database private key is memory capacity. In earlier designs of our scheme, we experimented with loading millions of records representing our database private key into memory from disk as we tried to keep track of more metadata related to our anonymized table(s). Because there were so many rows to load, occasionally the driver on our test machine, a laptop with 2 GB or RAM, would hang with error messages such as "out of heap space". It is possible that if there are many private key files for many tables to load—i.e., one, two, or more million rows placed into memory—, the driver may similarly hang on client machines. There are three possible solutions to this problem. One is to purchase more memory for the hanging client workstations. Two is to allocate more overall memory to our driver on the hanging machines. When we increased our internal JAVA (programming language) heap size on our test machine, through a re-configuration of the JAVA (programming language) Virtual Machine, we alleviated the problem. The third solution is to again create a daemon which will manage the database private key for all client workstations. This daemon can be placed on a separate machine which has a large memory. It will communicate with all the clients, or just those that hang, if that is better, when they need access to the database private key.

EXAMPLE 5

This Example analyzes why an initial group count of 5 is chosen in Anonymization Step 3. A final total group count of about 30, produced from an initial group count of 5, as explained in Anonymization Step 3, makes it exceedingly difficult to break the string encodings that will be contained in A1. To understand why, we must first understand how the intruder attempts to break our scheme. Let's recall that we anonymize numeric columns by using a monotonic function which preserves the ordering of numbers within every group across all numeric columns. The intruder can use his O1 copy, chose a numeric column M0 he likes, sort it in descending order, and extract the highest values from the column. Then he locates the corresponding column M1 in A1, and launches a matching process to relate his highest values in M0 with the highest values in M1. As M1 is broken into groups, the intruder uses a loop operation to examine every group he sees in M1. O1's highest values had to have been distributed within A1 somehow, and this matching process attempts to locate them.

As he links the two ordered sets of M0 and a particular group within M1, the intruder extends the hypothetical links of numbers into links of strings. What we mean is: suppose the intruder has identified a row in M1 that he thinks matches one of his highest numeric values in M0. He now makes a hypothetical assumption that the decryption of the field s1 from some string column S1 from A1 (restricted to the row of matching numbers) has value s0 which is a field in the corresponding column S0 from O1 (restricted to the row of matching numbers). He propagates s0 as a decoding key onto all characters within the group that match by position and value to the characters of s1. If he is able to completely replace all of A1's character strings in that group without conflicts (i.e. no interference with decoding attempts based on prior numerical matches), the intruder has found a potential way to decode the group. By going through the matching process and bringing in more decoding rules (i.e. more s0's), the intruder either completes the decoding of the entire group, or must revisit his previous assumptions and make new matching assumptions for steps he previously completed. If his initial selection of the set of highest numbers in M0 and group in M1 are large enough he will likely succeed, though it will cost him an enormous amount of time as we calculate below. The remaining highest numeric values from O1 can be used to try and decode another group in A1, until all groups in the table are so decoded. Given this approach, we suggest the following heuristic approach to find the number of groups into which A1 should be divided. The output of these calculations is an estimate of the maximum time it takes for the intruder to successfully decode one group.

> Upper bound, in seconds, on time to "break" one group=[(1% of total # of rows in O1)*(total # of groups in A1)*(1% of total # of rows in A1 group)$^3$*(total # of rows per group in A1)*(total # of characters to be decoded per row in A1 group expressed as # of general operations to be carried out on a computer)*(total # of assembly statements required to handle one general operation on a computer)]/[(total # of assembly statements performed by intruder's computer per second)*(# of computers employed by intruder)]

The intuition for these terms stems from our description of the intruder's approach above:

The factor (1% of total # of rows in O1) arises because the intruder wants to focus on the top (e.g., 1%) of the numeric values in O1's numeric column. These are the "extreme" values which allow her to match the most "extreme" (i.e., highest) values in A1's numeric column, leading to more certainty in the matching of values.

The factor (total # of groups in A1) arises because, in the worst case, the intruder may need to decode every possible group in A1 until he reaches the last group where decoding finally succeeds.

The factor (1% of total # of rows in A1)$^3$ arises because the intruder has to, in the worst case, complete a nested-loop three levels deep as he tries to decode A1's string column. First, the intruder has to loop through all possible numbers, call them Ps, in the highest numerical values of A1's group. He is trying to match them with the highest numbers in O1's group. Given an initial "seed", i.e. a possibly matching P, the intruder tries every other number in his list, we can call them Qs, one by one. He tries to decode the remaining strings in A1's group using the associated strings from O1 which match the Qs. Imagine he gets closer to the end of the list of Qs and fails. That is, he finds he cannot impose a decoding scheme on A1's group using the O1 string matched to the current Q record due to decoding conflicts (e.g., the characters he's trying to decode have already been decoded via a match with a previous Q record). He has to back up one position, to (n−1), and try the n-th decoding (the decoding for the current Q record), as the (n−1)-th decoding. He has achieved success until now, therefore, he can remove the decoding of the previous O1 string and attempt to decode using the current O1 string. In the worst case, he will have to go down to almost the end of the list of Qs, then be forced to retrace his steps back to the beginning of the list, and attempt to traverse the (almost) complete list again, trying to find a proper decoding for A1's string column in the group.

The factor (total # of rows per group in A1) arises because for every numerical match, the intruder will have to decode at most the entire string column within A1's group using the value from O1's string column. As explained before, during anonymization, we try to maintain the same number of rows per group in every Ai table.

The factor (total # of characters to be decoded per row in A1 group expressed as # of general operations to be carried out on a computer) arises because for each string replacement attempt, the CPU has to replace, e.g. using SUBSTRING or other pattern matching operations; a specific number of characters in the string. For example, it could be the maximum string length for the column.

The factor (total # of assembly statements required to handle one general operation on a computer) arises because a general operation to replace one character within some higher level language (in which the intruder's program presumably would be written) would take more assembly instructions to actually carry out on a computer.

The factor (total # of assembly statements performed by intruder's computer per second) arises because we need to incorporate how long it will take the intruder's computer to replace one character during the decoding attempt.

The factor (# of computers employed by intruder) arises because the intruder can use more than one CPU and have them work in parallel trying to decrypt the group. The main loop in our "algorithm" above (and alluded to in step 1 above), can be broken up so that different computers are trying to successfully replace strings in their own range of the highest numeric values in O1.

As an illustration of a possible computation of the upper bound, imagine the following values exist for a given installation of our scheme at a customer site:

(1% of total # of rows in O1)=10,000 (i.e., assume an O1 of 1,000,000 rows)
(total # of groups in A1)=30 (i.e., imagine the resulting A1 is divided into 30 groups)
(total # of rows per group in A1)=100,000 (i.e., assume an A1 of approximately 3,000,000 and a group count of 30)
(1% of total # of rows in A1)$^3$=(1000)$^3$ (i.e., assume an A1 of approximately 3,000,000 rows and a group count of 30. Therefore, the row count per group is 100,000, and 1% of this is 1000)
(total # of characters to be decoded per row in A1 group)= 10 (i.e., assume we are working with column Last Name which has a maximum length of 10 characters. In the worst case, all of these characters would have to be decoded when decoding a row)
(total # of assembly statements required to handle one general operation on a computer)=10
(total # of assembly statements performed by intruder's computer per second)=3,000,000,000 (i.e., a CPU operating at 3.0 GHz)
(# of computers employed by intruder)=1

Therefore, upper bound on the time to break one group, in seconds, is:

$$[(10000)*(30)*(1000)^3*(100000)*(10)*(10)]/[(3000000000)*(1)]=1,000,000,000,000$$
$$\text{seconds} \sim 31{,}700 \text{ years}$$

Although this is a very high number, it's important to point out that this upper bound estimates the effort to decode one group. The intruder will have to apply similar logic, using his remaining highest values in his 10,000 original O1 values, to decode the other groups. Only then has he successfully decoded the full table. The upper bound to decode the entire table would therefore be significantly higher than the estimate above. But even decoding the complete table does not mean that the intruder has decoded the original table. Since we add false rows to A1 as part of anonymization, the intruder may obtain a successful decoding on the false groups. Some or many false groups would be decoded via the approach above because false groups are made to mimic true rows and true groups. The intruder cannot definitively say he's decoded the original values because he may have decoded fake values. That is why the final group count of about 30, and an initial group count of 5, is useful for near any table. The upper bound on the time to break the entire table is extremely high. And even if he achieves "success," the intruder still can't be sure he's decoded the true rows.

GLOSSARY

| Term | Definition |
| --- | --- |
| ODB | The original unencrypted database. |
| O1 ... Op, Oi, Oj | O1 ... Op are the original unencrypted tables making up the ODB: O1 through Op. Oi and Oj are the more generic descriptions of these tables. That is, i, j = 1 ... p. |
| ADB | The anonymized database into which the ODB is converted. |
| A1 ... Ap, A2, Ai, Aj | A1 ... Ap are the anonymized tables making up the ADB, into which tables O1 through Op are converted. A2, and more generally, Ai and Aj are the same as tables A1 ... Ap. That is, in the case of Ai and Aj, i, j = 1 ... p. |
| V1 | Table to hold all possible alphanumeric symbols making up tables O1 ... Op. The overall goal of V1 is to maintain the data schema of the ODB in the ADB so that existing database applications continue to work. V1 is used for constructing the private encoding/decoding key for each Ai, |

GLOSSARY

| Term | Definition |
|---|---|
| | including the key to encode/decode string value lengths for each Ai. |
| B1 | The first temporary table into which O1 is converted as it is being anonymized. |
| GpNum | New column introduced into every table A1 through Ap as tables O1 through Op are anonymized. GpNum holds the number of the group to which a given row belongs. Used to discard rows from result sets that belong to "false" groups (i.e. which contain fake records) and retain rows that belong to "true" groups (i.e. containing the original ODB data). |
| RecInfo | New column introduced into every table A1 through Ap as tables O1 through Op are anonymized. RecInfo contains the lengths of each string value in that row, permuted to be represented as a character within the list of V1 symbols. Used to trim string values in results sets so that the proper string values can be returned to the user. |
| RowNum | New column introduced into every table A1 through Ap as tables O1 through Op are anonymized. RowNum is the row number for the row. Used to determine if a numeric value in a result set row was originally an outlier so that its proper outlier value can be restored before it's returned to the user. |
| R1, Ri | R1 is a table used for DELETE command processing. It holds the RowNums for those rows that are scheduled for deletion. If any rows in R1 are implicated in any query they will not be processed because the rows are ultimately scheduled to be erased. Ri is just like R1 but for the other Ai tables; that is, i = 2 . . . p. Ri is used to handle the processing of the DELETE command for each Ai. Ri holds the RowNums of rows that are scheduled for deletion. If any rows in Ri are implicated in any Ai query they will not be processed because they are scheduled to be erased. |
| E1 | Temporary table used to foil re-identification attempts via token frequency analysis attacks. E1 contains a histogram of tokens in every string column in B1. In every column in the histogram, tokens are combined into disjoint sets of 5. E1 records the number of rows needed for each token to equal the frequency of the leader in its 5-element group. Used in conjunction with the C1 table. |
| C1 | Temporary table used with E1; it contains "false" rows randomly selected from B1. Tokens will be replaced in the columns in C1 based on their "rows needed" parameter in E1. The purpose of this replacement is to ensure that result sets involving string tokens in any 5-group set will return true and false rows whose total number approximately equals, which considerably undermines re-identification efforts. |
| Aggregated "rows needed" value | Used in the context of E1 and F1. The total number of "rows needed" for a given column or position in, respectively, E1 or F1. This number represents the total number of rows needed within a column or position for all, respectively, tokens or positions in their 5-element groups to equal the frequency of their leaders of their 5-element groups. |
| F1 | Temporary table used to foil re-identification attempts from character frequency analysis attacks. It contains a histogram of every character position of every string column in B1. For every position in every column in the histogram, its character values are grouped into disjoint sets of 5. F1 records the number of rows needed for each position to equal the frequency of the leader in its 5-element group. Used in conjunction with the D1 table. |
| D1 | Temporary table used with F1; it contains "false" rows randomly selected from B1. Character positions will be replaced in the columns in D1 based on their "rows needed" parameter in F1 to ensure that result sets involving character positions in any 5-group set will return true and false rows whose total number approximately equals, which significantly undermines re-identification efforts. |
| G1 | Temporary table, a copy of B1. Used to reorder the groups in B1 to further obscure any potential insecure groupings of rows. |
| Y1 | Temporary table, a copy of G1. This table, listing which GpNums are true and false in A1, will become part of the database private key. It will be used to discard rows from false groups in results sets when they are returned from the server to the client. |
| H1 | A table containing the original outlier values and the values that replaced them. This table will become part of the database private key for A1 to properly restore outlier values on the client when results sets from the server involving A1 contain masked outlier values. |
| X1, Xi | X1 is a table used for JOINing A1 with A2 on a single column. X1 contains all the unique values within that single column in A2 replicated and encoded as many times as there are groups in A1. It will be used in conjunction with the J1 construct to restore the result set of the JOIN command on the client. Similarly, Xi is a table used for JOINing Ai with Aj on a single column more generally. Xi contains all the unique values within the implicated column in Aj replicated and encoded as many times as there are groups in Ai. Like X1, Xi is used to restore the JOIN result set on the client. |
| B2, Bi | B2, and more generally, Bi, is the same as table B1 but used for anonymizing table O2 or (more generally) table Oi. |
| Database Private Key | A set of nine files to be made available to client machines so they can interact with the ADB. The database private key is composed of the Ai table private key files and general database files. The following are the Ai table private key files: |

-continued

GLOSSARY

| Term | Definition |
|---|---|
| | 1. The Y1 table, indicating whether a particular group is true or false. |
| | 2. The file describing how each character position is encoded for each group in each string column. This file also describes the encoding for each string length "column" in each group. |
| | 3. The file describing the average, random multiplier, and random addend for each numeric column in each group. |
| | 4. The H1 table, describing the original and modified numeric outlier values in certain rows. |
| | 5. The file containing the maximum lengths of each padded string column. |
| | 6. The file describing how many rows there are in the table. |
| | 7. The file describing how many groups there are in the table. |
| | The following are the general database files: |
| | 1. The V1 table, containing the domain of the characters in O1 ... Op. |
| | 2. The file describing how many rows the database server can handle within an anonymized subquery whose components are linked by OR statements. |
| J1 | A temporary table used when JOINing two tables in the ADB. It contains the results of the first table JOINed to table X1 combined with the results of X1 JOINed to the second table. J1 is used to restore the result set of the JOIN on the client. |
| R1O | Just like the R1 table for the A1. R1O is just a reference to a table associated with O1. It's used for comparing the performance of the DELETE command on an A1 table with an O1 table. R1O holds those O1 row numbers that are scheduled for deletion. If any rows in R1O are implicated in any O1 query they will not be processed because they will ultimately (in theory, because we never actually deleted any O1 rows in testing) be erased. |

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims.

The invention claimed is:

1. A computer-implemented method of anonymizing a database and querying it comprising:
   (a) anonymizing a database on a server computer,
   (b) hosting said database on a server computer,
   (c) generating a query on a client computer,
   (d) encrypting the query on the client computer to form an encrypted query,
   (e) transmitting the encrypted query to the server computer,
   (f) operating on the encrypted query at the server computer to produce an encrypted result,
   (g) returning the encrypted result to the client computer,
   (h) post processing the encrypted result on the client computer, without decryption, to produce a post processed encrypted result,
   (i) decrypting the post processed encrypted result at the client computer to produce a decrypted result and presenting the decrypted result to the user;
       wherein anonymizing the database is accomplished by forming two or more groups within at least one table, wherein each group is associated with an anonymization key and wherein at least two of said two or more groups overlap.

2. The method of claim 1 wherein the database is anonymized by a method which works on a single database table at a time.

3. The method of claim 1 wherein the database is anonymized by a method which anonymizes all columns of a table.

4. The method of claim 1 wherein the database is anonymized by a method which combines a deterministic process with the generation of database records which contain appropriately created fake values, wherein the number of said database records is determined by constructing mutually exclusive n-element groupings for lists of elements in the original database ordered by frequency of said elements and then creating the fake rows based on the n-element groupings which create the most fake rows.

5. The method of claim 1 wherein the database is anonymized by a method wherein a mathematical function with different anonymization parameters for each numeric column and each group is used to encode each numeric value.

6. A computer-implemented method of anonymizing a database and querying it comprising the steps of:
   (a) anonymizing a database on a server computer,
   (b) hosting said database on a server computer,
   (c) generating a query on a client computer,
   (d) encrypting the query on the client computer to form an encrypted query,
   (e) transmitting the encrypted query to the server computer,
   (f) operating on the encrypted query at the server computer to produce an encrypted result,
   (g) returning the encrypted result to the client computer,
   (h) decrypting the encrypted result at the client computer to produce a decrypted result, and
   (i) post processing the decrypted result at the client computer to produce a result and presenting the result to a user;
       wherein anonymizing the database is accomplished by forming two or more groups within at least one table and wherein each group is associated with an anonymization key and wherein at least two of said two or more groups overlap.

7. The method of claim 6 wherein the groups comprise subsets of rows from the at least one table.

8. The method of claim 7 wherein the groups are broken into subgroups for further anonymization.

9. The method of claim 6 wherein the anonymization key comprises subkeys.

10. The method of claim 6 wherein the table comprises zero or more false rows.

11. The method of claim 6 wherein the table is divided into one or more element groups comprising elements obtained from columns or character positions within string columns.

12. The method of claim 11 wherein each element comprises false and real rows with the proviso that each element within an element group comprises the same number of total rows.

13. The method of claim 6 wherein indices are constructed over encrypted data.

14. The method of claim 6 wherein step (a) comprises:
   a. transforming a numeric value monotonically using a unique set of random parameters for each group to produce a result, and
   b. storing the result in place of the numeric value in the table.

15. The method of claim 6 wherein step (a) further comprises: creating extra tables comprising joinable elements wherein the extra tables facilitate one or more JOIN operations on two or more columns from two or more original tables.

16. A computer-implemented apparatus for performing computations on encrypted data and querying encrypted data, comprising: (1) a computer system; (2) logic, performed by the computer system, for (a) anonymizing a database on a server computer, (b) hosting said database on a server computer, (c) generating a query on a client computer, (d) encrypting the query on the client computer to form an encrypted query, (e) transmitting the encrypted query to the server computer, (f) operating on the encrypted query at the server computer to produce an encrypted result, (g) returning the encrypted result to the client computer, (h) post processing the encrypted result on the client computer, without decryption, to produce a post processed encrypted result, (i) decrypting the post processed encrypted result at the client computer to produce a decrypted result and presenting the decrypted result to the user; wherein anonymizing the database is accomplished by forming two or more groups within at least one table, wherein each group is associated with an anonymization key and wherein at least two of said two or more groups overlap.

17. An article of manufacture comprising a program storage device embodying instructions for a computer-implemented method for performing computations on encrypted data and querying encrypted data, the logic comprising: (a) anonymizing a database on a server computer, (b) generating a query on a client computer, (c) encrypting the query on the client computer to form an encrypted query, (d) transmitting the encrypted query to the server computer, (e) operating on the encrypted query at the server computer to produce an encrypted result, (f) returning the encrypted result to the client computer, (g) decrypting the encrypted result at the client computer to produce a decrypted result, and (h) post processing the decrypted result at the client computer to produce a result and presenting the result to a user; wherein anonymizing the database is accomplished by forming two or more groups within at least one table and wherein each group is associated with an anonymization key; and wherein at least two of said two or more groups overlap.

18. A client-server database system comprising:
   (a) at least one client computer,
   (b) at least one server computer, and
   (c) a network connecting the client computer and the server computer,
   (d) wherein the server computer hosts an anonymized database, the anonymized database is operated upon by the server computer to produce an encrypted results set in response to an encrypted query from the client computer, the encrypted results set is sent from the server to the client computer, the encrypted result is post processed on the client computer, without decryption, to produce a post processed encrypted results set, and the post processed encrypted results set is decrypted by the client computer to produce a decrypted result to be presented to a user, wherein the anonymized database is anonymized by forming two or more groups within at least one table and wherein each group is associated with an anonymization key; and wherein at least two of said two or more groups overlap.

19. The system of claim 18 wherein the groups comprise subsets of rows from the at least one table.

20. The system of claim 18 wherein the anonymization key comprises subkeys.

21. The system of claim 18 wherein the table comprises zero or more false rows.

22. The system of claim 18 wherein the table is divided into one or more element groups comprising elements obtained from columns or character positions within string columns.

23. The system of claim 22 wherein each element comprises false and real rows with the proviso that each element within an element group comprises the same number of total rows.

24. The system of claim 18 wherein indices are constructed over encrypted data.

25. The system of claim 18 wherein the anonymized database is anonymized by:
   transforming a numeric value monotonically using a unique set of random parameters for each group to produce a result, and
   storing the result in place of the numeric value in the table.

26. The system of claim 18 wherein the groups are broken into subgroups for further anonymization.

27. The system of claim 18 wherein the anonymized database is anonymized by: creating extra tables comprising joinable elements wherein the extra tables facilitate one or more JOIN operations on two or more columns from two or more original tables.

* * * * *